(12) United States Patent
Kikugawa

(10) Patent No.: US 6,950,202 B1
(45) Date of Patent: Sep. 27, 2005

(54) APPARATUS FOR RETRIEVING DOCUMENT DATA

(75) Inventor: Makoto Kikugawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/473,659

(22) Filed: Dec. 29, 1999

(30) Foreign Application Priority Data

Jan. 22, 1999 (JP) .................................. 11-013903

(51) Int. Cl.[7] .......................... G06F 15/00; G06F 1/00
(52) U.S. Cl. .................... 358/1.15; 358/1.15; 358/1.13; 358/403; 713/201
(58) Field of Search ............................... 358/1.15, 400, 358/404, 468, 403, 405, 444, 401, 1.14; 713/201; 707/1–6, 707/104.1

(56) References Cited

U.S. PATENT DOCUMENTS

| | | | | |
|---|---|---|---|---|
| 4,992,783 A | * | 2/1991 | Zdunek et al. ............. | 340/5.74 |
| 5,764,807 A | * | 6/1998 | Pearlman et al. ........... | 382/240 |
| 5,793,952 A | * | 8/1998 | Limsico ...................... | 713/202 |
| 6,181,440 B1 | * | 1/2001 | Masuda ....................... | 358/434 |
| 6,307,640 B1 | * | 10/2001 | Motegi ....................... | 358/1.14 |

FOREIGN PATENT DOCUMENTS

| | | |
|---|---|---|
| JP | 6-284147 | 10/1994 |
| JP | 11-66004 | 3/1999 |
| JP | 11-68733 | 3/1999 |

* cited by examiner

Primary Examiner—Gabriel Garcia
Assistant Examiner—Thierry L. Pham
(74) Attorney, Agent, or Firm—Fitzpatrick, Cella, Harper & Scinto

(57) ABSTRACT

An information input/output system capable of reliably preventing improper leakage of information and of keeping confidential information secret. The information input/output system provides a digital copying machine compositely having a plurality of functions, such as a filing function, an OCR function, a facsimile function and a network function. The digital copying machine performs an information retrieval on the basis of a password from a user in response to an information retrieval requirement (information retrieval request) made through its operating section, an information retrieval requirement made by a information retrieval sheet sent from the external through the use of a facsimile or an information retrieval requirement made through a personal computer on a network. After the completion of the information retrieval, the digital copying machine issues a new password (for example, at random) and makes the previously used password invalid.

51 Claims, 23 Drawing Sheets

<RETRIEVAL> ▼▲   SELECT AND SET BY KEY    [CANCEL]

DISK NAME       : 0001
DOCUMENT NAME :
DOCUMENT NUMBER :                    →
UPDATE DATE     :   —   —   →   —   —

▼ ▲ [SETTING]                    [EXECUTION OF RETRIEVAL]

▼▲  SELECT DOCUMENT BY KEY

| DISK NAME | NUMBER | DOCUMENT NAME | UPDATE DATE | NUMBER OF SHEETS |
|---|---|---|---|---|
| 0001 | 0001 | CONFERENCE 1 | 1996-3-15 | 5 |
| 0001 | 0002 | CONFERENCE 2 | 1996-4-2 | 20 |
| ⋮ | ⋮ | ⋮ | ⋮ | ⋮ |
| 0001 | 0010 | REPORT 1 | 1995-8-20 | 6 |

[SEQUENCING] [DOCUMENT OPERATION] [PRINT] [▼] [▲] [RE-RETRIEVAL] [END]

DISPLAY OF RETRIEVED DOCUMENT

FIG. 9

RETRIEVAL SHEET FOR FILE
<HOW TO USE FILE RETRIEVAL SHEET>
☐ WRITE MARK "☒" OR "■" CLEARLY
☐ SET RETRIEVAL SHEET IN FEEDER AFTER WRITING, OR PERFORM FAX TRANSMISSION

SEE INSTRUCTION MANUAL FOR DETAIL

| DOCUMENT INFORMATION | |
|---|---|
| DISK NAME | : 0001 |
| DOCUMENT NAME | : CONFERENCE 1 |
| DOCUMENT NUMBER | : 0001 |
| ACCESS DATE | : 1996-3-15 |
| UPDATE DATE | : 1996-3-15 |
| NUMBER OF SHEETS | : 5 |

| AUTO PRINT/FAX AFTER RETRIEVAL | REPLY-RECEIVING FAX No ☐ | FAX REPLY TIME SETTING ☐ |
|---|---|---|
| ☐ YES  ☐ NO  ☐ FAX | — — | / / — |

RETRIEVAL PASSWORD

P. 0001/0005
RESOLUTION : 400×400dpi

CONFERENCE REPORT

```
RECEIPT OF RETRIEVAL  : 0013
DATE OF RECEIPT       : 96/03/14
RETRIEVER ID          : 3302
DISK NAME             : 0004
DOCUMENT NAME         : CONFERENCE PROCEEDING 1
NUMBER OF SHEETS      : 05
RETRIEVING MEANS      : FAX

RETRIEVAL ALLOWED ?
            YES/NO
```
⎬ 533

FIG. 13

```
THIS RETRIEVAL WAS REJECTED.

DATE OF RETRIEVAL  : 0013
RECEIPT DATE       : 96/03/14
RETRIEVER ID       : 3302
DISK NAME          : 0004
DOCUMENT NAME      : CONFERENCE PROCEEDING 1
NUMBER OF SHEETS   : 05

> FAX TRANSMISSION TABLE
>
> REQUEST ID            Mr.
> THE FOLLOWING DATA REQUESTED IS SENT.
>
> DISK NAME        : 0004
> DOCUMENT NAME    : CONFERENCE PROCEEDING 1
> NUMBER OF SHEETS : 05
>
>         NUMBER OF PAGES IN FAX TRANSMISSION : 6
>                   (INCLUDING TRANSMISSION TABLE)

> FAX TRANSMISSION TABLE
>
> REQUEST ID            Mr.
> THE FOLLOWING DATA REQUESTED CANNOT BE SENT.
>
> DISK NAME        : 0004
> DOCUMENT NAME    : CONFERENCE PROCEEDING 1
> NUMBER OF SHEETS : 05
>
>         NUMBER OF PAGES IN FAX TRANSMISSION : 1
>                   (INCLUDING TRANSMISSION TABLE)

—536

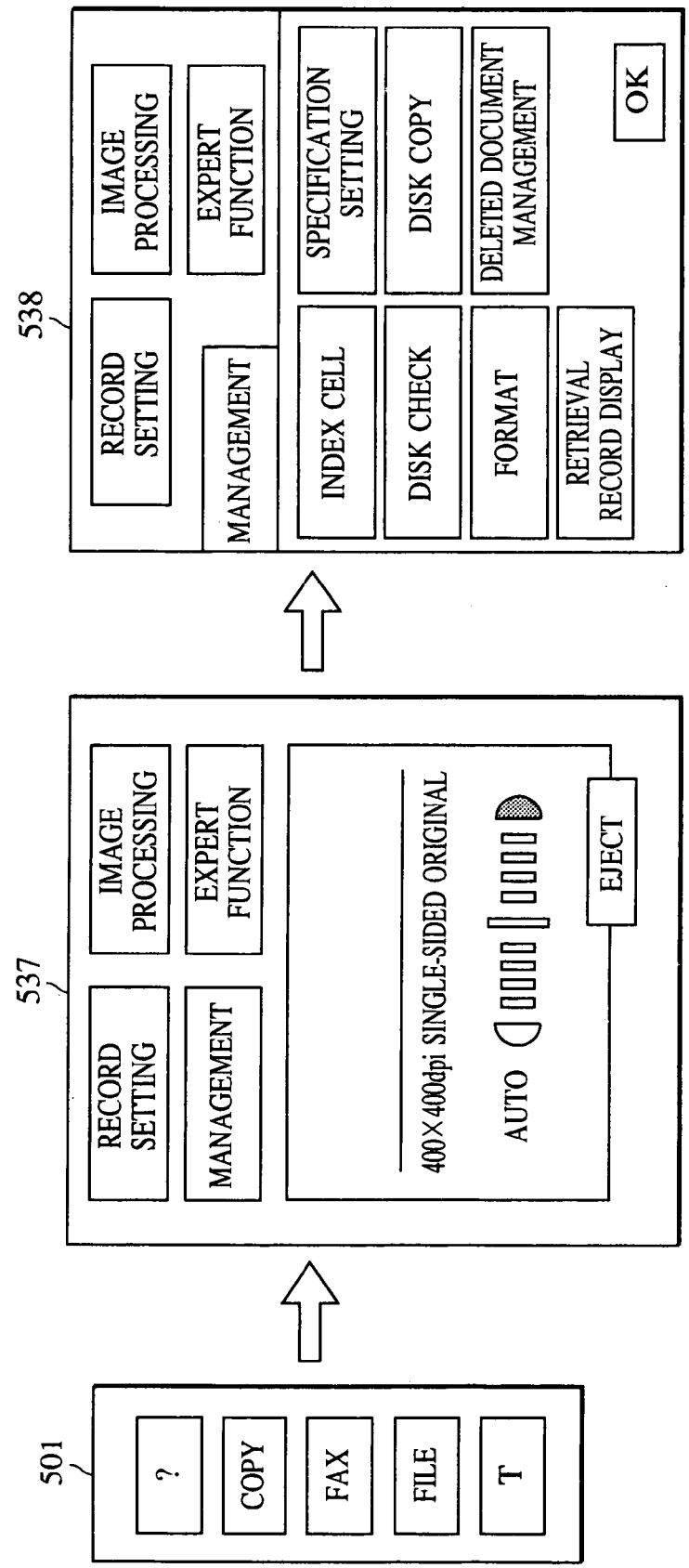

FIG. 17

RETRIEVED DOCUMENT RECORD

| RECEIPT NUMBER | DISK NAME | DOCUMENT NAME | NUMBER OF SHEETS | RECEIPT DATE | MEANS | RETRIEVAL ID | APPROVAL ID | RESULT |
|---|---|---|---|---|---|---|---|---|
| 0013 | 0004 | CONFERENCE PROCEEDINGS 1 | 05 | 96/03/14 15:14 | FAX | 3302 | 1609 | OK |
| 0014 | 0012 | ACCOUNTS 1 | 02 | 96/03/15 09:20 | FAX | 3015 | 1609 | OK |
| 0015 | 0007 | CONFERENCE PROCEEDINGS 12 | 04 | 96/03/15 10:30 | PC | 3030 | 1609 | OK |
| 0016 | 0009 | CLIENT 1 | 10 | 96/03/15 11:20 | FAX | 3145 | 1609 | OK |
| 0017 | 0010 | CLIENT 20 | 08 | 96/03/15 13:40 | SHEET | 3145 | 1609 | OK |
| 0018 | 0002 | ADDRESS BOOK 10 | 02 | 96/03/15 14:25 | FAX | 3030 | 1609 | OK |
| 0019 | 0011 | CLIENT 25 | 03 | 96/03/16 09:30 | SHEET | 3215 | 1609 | NG |
| 0020 | 0013 | ACCOUNTS 20 | 11 | 96/03/16 16:20 | PC | 3331 | 1609 | OK |

LIST PRINT ← → OK

|  | CASE | PAGE |
|---|---|---|
| SCAN | 720 | 8600 |
| PRINT | 850 | 12000 |
| SCAN JAM | 5 | |
| PRINT JAM | 3 | |

OK  RETURN

| SCAN | CASE |
|---|---|
| 1996/1 | 80 |
| 1996/2 | 70 |
| 1996/3 | 35 |
| 1996/4 | 45 |
| 1996/5 | 36 |
| 1996/6 | 60 |

▼ ▲  PAGE  OK  RETURN

| SCAN | | PAGE |
|---|---|---|
| 1996/1 | | 510 |
| 1996/2 | | 450 |
| 1996/3 | | 390 |
| 1996/4 | | 610 |
| 1996/5 | | 480 |
| 1996/6 | | 658 |
| ▼ ▲ | SIZE | OK  RETURN |

| SCAN | SIZE | PAGE |
|---|---|---|
| 1996/1 | A 4 | 460 |
|  | A 3 | 50 |
| 1996/2 | A 4 | 385 |
|  | A 3 | 65 |
| 1996/3 | A 4 | 300 |
|  | A 3 | 90 |
| ▼ ▲ | | RETURN |

| SCAN JAM | CASE |
|---|---|
| 1996/1 | 0 |
| 1996/2 | 1 |
| 1996/3 | 0 |
| 1996/4 | 0 |
| 1996/5 | 1 |
| 1996/6 | 0 |

▼ ▲　　　　　　　RETURN

NEW PASSWORD IS ISSUED.

[3315]

—546

APPARATUS FOR RETRIEVING DOCUMENT DATA

BACKGROUND OF THE INVENTION

1. Field of the Invention

The present invention relates to an information processing system, a network system, an information managing method, and a record medium in which information processing steps are stored to be readable by a computer, which are applicable to, for example, digital copying machines and other apparatus capable of expansively accepting functions of facsimiles, printers, and electronic files, OCRs, networks, and others.

2. Description of the Related Art

In recent years, for example, a functional expansion based upon the integration of the functions of a facsimile, a printer, an electronic file, an OCR or the like has been in progress. Additionally, such a digital copying machine agrees with a network system involving connections of a plurality of computers, and also has developed toward an apparatus a plurality of users can operate through their personal computers (which will hereinafter be referred to simply as PCs) and a network connected thereto.

Meanwhile, unlike conventional document management, in which documents are kept in binders or the like, electronic files (electronic filing systems) have contributed to the saving of space by virtue of the documents being written in a memory, such as a magneto-optical disk or the like (herein after "MO").

In such electronic files, retrieval of a document the user wants depends upon the designation of a document name or a document number and, for example, in the case of the MEDIO digital cabinet produced by Canon Inc., a retrieval sheet is printed out when a document is recorded, and is read in when the same document is outputted the next time; in this way the document the user wants is fetched selectively from a plurality of documents recorded on one recording medium such as an MO. This permits users to retrieve the desired document easily.

In addition, because a changer drive, which can manage a plurality of recording mediums such as MOs, has come into widespread use, a file system capable of managing a large volume of information has showed up. Also, as information retrieving methods for use in a filing system, there have been known various methods, including the techniques of: users making the retrieval directly through an operating section; retrieving information in accordance with a retrieval request sheet from a facsimile; and retrieving information through the use of a PC on a network.

However, in the aforesaid filing system or the like enabling the management of a large volume of information and allowing the various retrieving methods, difficulty has been encountered in preserving the confidential of the information as desired.

Concretely, in general, before the operation by which the users retrieve information, the input of a password is necessary. Additionally, in an information processing system such as a digital copying machine having a plurality of functions such as facsimile, printer, electronic file, OCR and others, selection as to whether a password is required ("setting", "no setting"), is made function by function. That is, passwords can also be set for some functions, which then are usable subject to the input of the correct password, while passwords need not be required for other functions. In the case of a function (or apparatus) requiring the input of a password, users can use it freely if once they learn the password. This signifies that any users who were at the operating position at one point in time, can still use the function (apparatus) as long as they remember the password, even if for example they have since lost their operating qualification (right to use that function or apparatus) due to change of work, transfer, retirement or the like. Accordingly, particularly, in a system for managing documents in which secret documents may be handled, there is a possibility that disqualified users (users who have lost their operating qualification but who remember the password) can access the secret documents.

SUMMARY OF THE INVENTION

Accordingly, the present invention has been developed with a view to eliminating these drawbacks, and it is an object of the invention to provide an information input/output unit, a network system, an information managing method and a record medium storing information processing steps to be readable by a computer, which are capable of reliably preventing improper or illegal outward flow or leakage of (or other improper access to) information.

Another object of this invention is to maintain the confidentiality of secret information, even in case in which the users who had gained the right of access to secret documents, have since lost their access right thereto.

A further object of this invention is to, even in a case in which a password for access to document data in a document file has somehow leaked out to unauthorized person, prevent subsequent improper use of the password.

A further object of this invention is to provide a retrieval requesting method according to various modes to the users in the retrieval of document data in a document file.

A still further object of this invention is to return a retrieval result in an appropriate way to the user who has retrieved document data in a document file.

Yet a further object of this invention is to notify a user who has retrieved document data in a document file, of a new password in a way suitable for the mode the user used for a retrieval request.

For these purposes, according to an embodiment of this invention, there is provided an information processing system which, after receiving a valid password required for access to a predetermined information processing function and performing that function, then issues a new password, and uses the new password as a valid password instead of the old one for performing the next information processing function.

Other objects and features of the present invention will become more readily apparent from the following description of the preferred embodiments taken in conjunction with the accompanying drawings.

BRIEF DESCRIPTION OF THE DRAWINGS

FIG. 7 is an illustration useful for describing the input of conditions (restrictions) on information retrieval by the filing function;

FIG. 8 is an illustration useful for describing an operation for selecting desired information from information retrieved on the basis of the condition input;

FIG. 9 is an illustration useful for describing a retrieval sheet in another information retrieving method using the retrieval sheet;

FIG. 12 is an illustration useful for describing a state in which the contents of the information retrieval request are displayed in response to the input of the password;

FIG. 13 is an illustration useful for describing information to be given to the digital copying machine in a case in which the information manager rejects the information retrieval request;

FIG. 14 is an illustration useful for describing a facsimile transmitted writing to be used when the information manager accepts an information retrieval, in a further information retrieving method in which a request for information retrieval is made through facsimile transmission;

FIG. 15 is an illustration useful for describing a facsimile transmitted writing to be used when the information manager does not accept an information retrieval, in a further information retrieving method in which a request for information retrieval is made through facsimile transmission;

FIG. 16 is an illustration available for explaining an operation to be conducted when the digital copying machine confirms information about the information retrieval or the like;

FIG. 17 is an illustration available for explaining the recorded contents on a document retrieval which is one example of the contents to be confirmed;

FIG. 18 is an illustration available for explaining the recorded contents on scan, print, scan jam and print jam which are one example of the confirmation contents;

FIG. 19 is an illustration available for explaining the recorded contents on the number of times of scan at every month as one example of the confirmation contents;

FIG. 20 is an illustration available for explaining the recorded contents on the number of times of scan at every month as one example of the confirmation contents;

FIG. 21 is an illustration available for explaining the recorded contents on the number of times of scan at every size as one example of the confirmation contents;

FIG. 22 is an illustration available for explaining the recorded contents on the number of times of scan jam at every month as one example of the confirmation contents;

FIG. 24 is an illustration available for explaining a state in which the new password is handed over to a terminal unit which manages the information retrieval request;

DESCRIPTION OF THE PREFERRED EMBODIMENTS

Figure 1:
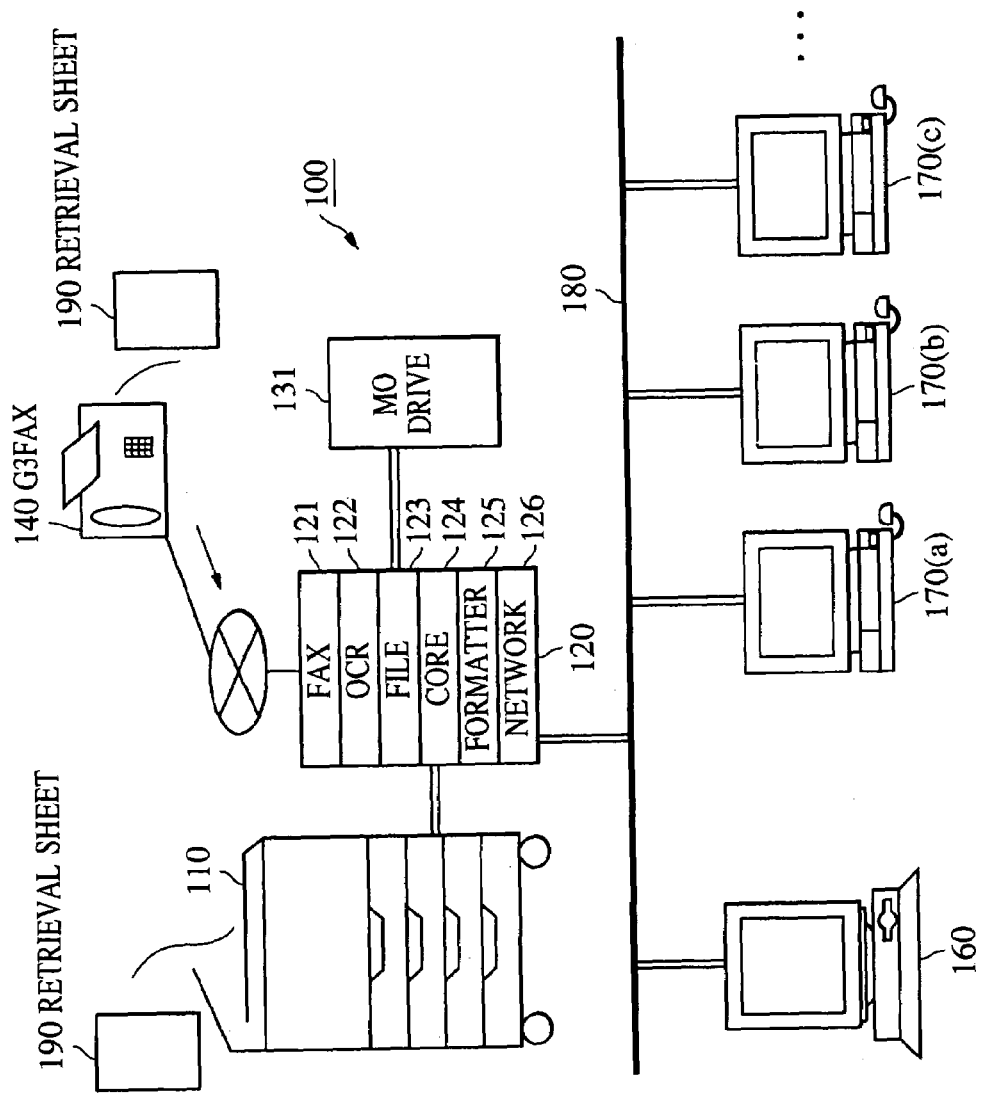
FIG. 1 is a block diagram showing a configuration of a filing system according to the present invention.

The present invention is applied to, for example, a filing system 100 shown in FIG. 1.

As illustrated, the filing system 100 is made up of a digital copying machine 110 including a reader section and a printer section, which will be described below, user side personal computers (PCs) 170(*a*), 170(*b*), 170(*c*), . . . capable of using the digital copying machine 110 through a network 180, and a terminal unit 160 for managing information retrieval requests from these PCs 170(*a*), 170(*b*), 170(*c*), . . . , which are connected to the network 180.

In addition, the digital copying machine 110 is equipped with an image input/output control section 120 and is connected through this image input/output control section 120 to the network 180.

The image input/output control section 120 includes a facsimile (FAX) section 121, an OCR section 122, a file (FILE) section 123, a core (CORE) section 124, a formatter section 125 and a network (NetWork) I/F section 126, and is further provided with an MO drive 131 for controlling an MO disk made to preserve image data of the file section 122. The MO drive 131 has a changer function to control a plurality of MO disks. Additionally, a G3FAX 140 is connected to the FAX section 121. Owing to this image input/output control section 120, the digital copying machine 110 combines its own function and a plurality of other functions such as facsimile and OCR, thus accomplishing functional extension.

Figure 2:
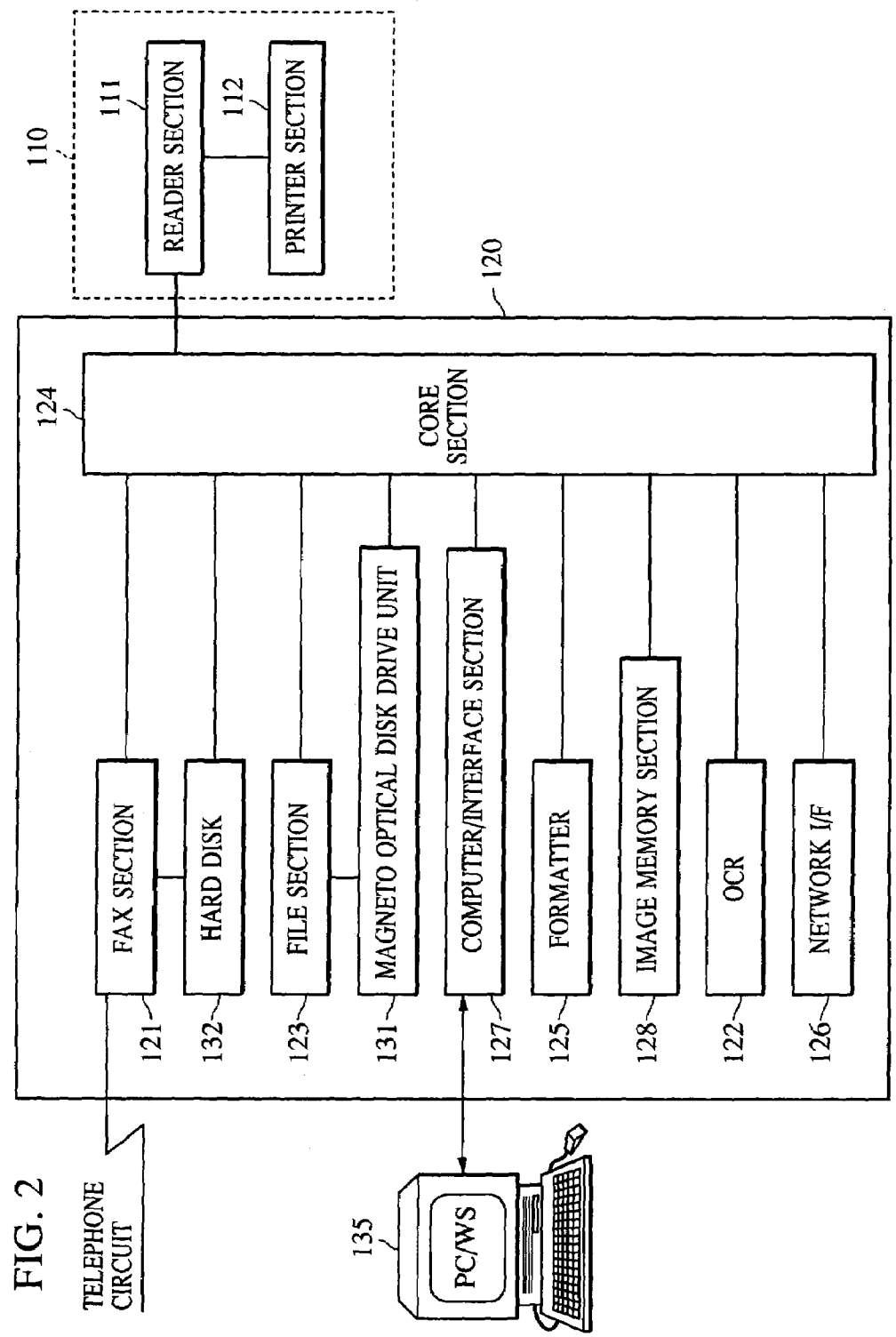
FIG. 2 is a block diagram showing a configuration of an image input/output control section belonging to a digital copying machine in the filing system.

FIG. 2 shows a configuration of the image input/output control section 120 more concretely.

That is, as FIG. 2 shows, in addition to the aforesaid components, the image input/output control section 120 includes a hard disk 132 connected to the FAX section 121, a computer interface (I/F) section 127 and an image memory section 128.

The FAX section 121, the file section 123, the computer I/F section 127, the formatter section 125, the image memory section 128, the OCR section 122 and the network I/F section 126 are each connected to the core section 124.

The FAX section 121 is in connection with a public network circuit (telephone circuit) to make FAX communications with the G3FAX 140 in FIG. 1, and other facsimile machines (not shown). Concretely, for example, the FAX section 121 expands compressed image data received through the telephone circuit and transfers the image data to the core section 124. At this time, when needed, the received compressed image data is retainable temporarily in the hard disk 132. Additionally, the FAX section 121 compresses image data transferred from the core section 124 and transmits the image data through the telephone circuit to the other party.

The file section 123 compresses the image data transferred from the core section 124 and puts the image data into a magneto-optical disk, set in an MO drive (in this case, a magneto-optical disk drive unit) 131, as a document file, together with a keyword for use in retrieval of this compressed image data.

In addition, the file section 123 retrieves the corresponding document file (compressed image data) from the magneto-optical disk set in the MO drive 131, on the basis of a keyword transferred through the core section 124, and reads out and expands the retrieved data before sending it to the core section 124.

The computer I/F section 127 acts as an interface lying between a personal computer or workstation (PC/WS) 135 and the core section 124. The PC/WS 135 corresponds to the PCs 170(a), 170(b), 170(c), . . . or the terminal unit 160 in FIG. 1.

The formatter section 125 is for translating code data indicative of an image transmitted from the PC/WS 135 into image data recordable by the printer section 134, while the image memory section 128 is for temporarily storing data transferred from the PC/WS 135.

The core section 124 is for controlling the flow of data among the reader section 133, the FAX section 121, the file section 123, the computer I/F section 127, the formatter section 125 and the image memory section 128.

Thus, the foregoing image input/output control section 120 is connected through the core section 124 to a reader section 111 of the digital copying machine 110.

The reader section 111 is connected to the printer section 112 to read an image of an original set an the reader and supplies the read data to the printer section 112 or the image input/output control section 120. The printer section 112 records (prints out) an image corresponding to image data from the reader section 111 or from the image input/output control section 120 on record paper.

Figure 3:
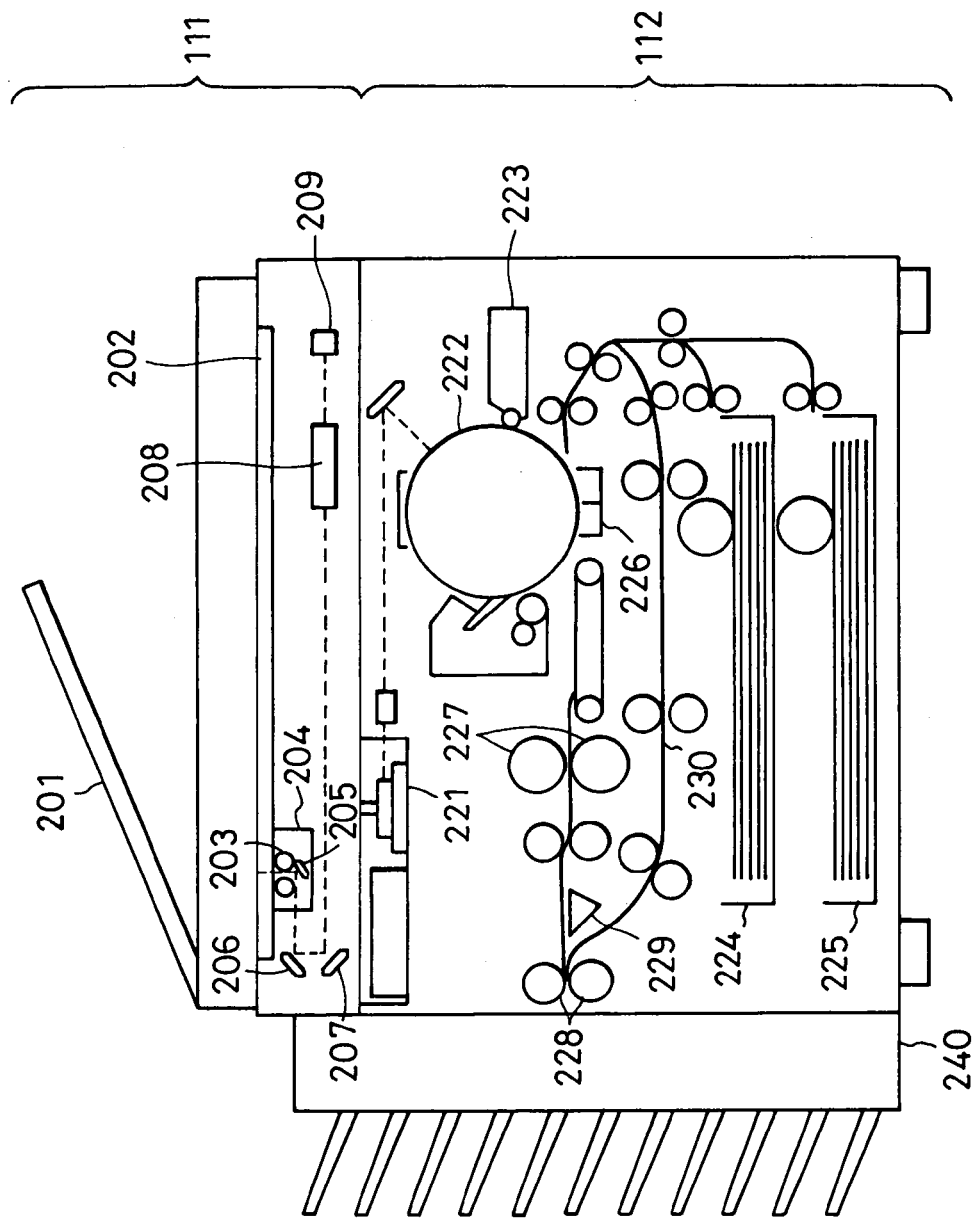
FIG. 3 is a cross-sectional view showing the digital copying machine.

FIG. 3 is an illustration (cross-section) of mechanical constructions of the reader section 111 and the printer section 112. In the reader section 111, an original feeding section 201 feeds the set originals one by one in order (for example, from the final page to the first page) onto a glass platen 202 and ejects the original from the platen 202 after the completion of the original reading. When the original is conveyed onto the glass platen 202, a lamp 203 goes on and a scanner unit 204 starts to move, thereby scanning and exposing the original. At this time, light reflected from the original is reflected by mirrors 205, 206 and 207 and passed through a lens 208 to a "CCD" image sensor (which will hereinafter be referred to simply as a CCD) 209. In this way, the CCD 209 reads out the image of the original. Image data outputted from the CCD 209, after undergoing predetermined image processing, is transferred to the printer section 112 or the core section 124 of the image input/output control section 120.

In the printer section 112, a laser light emitting section 221 is driven by a laser drive to emit laser light in accordance with image data outputted from the reader section 111. This laser light reaches a photosensitive drum (photoconductor) 222 to form a latent image corresponding to the laser light on the photosensitive drum 222. A developing unit 223 adheres a developer onto the latent image portion of the photosensitive drum 222. Subsequently, at a timing synchronous with the start of the laser light irradiation, record paper is fed from one of cassettes 224 and 225 and conveyed to a transfer section 226 so that the developer adhering to the photosensitive drum 222 is transferred onto the record paper. The record paper carrying the developer advances to a fixing section 227, where the developer is fixed on the record paper under heat and pressure applied by the fixing section 227. After passing through the fixing section 227, the record paper is ejected by ejecting rollers 228, while a sorter 240 puts the ejected record paper in the appropriate bin for sorting. (The sorter 240 puts the record paper in the uppermost bin if sorting is not set.) If double-sided recording is set, when the record paper reaches the ejecting rollers 228, the ejecting rollers 228 are rotated in the reverse direction so that the same record paper is led to a paper re-feeding path by a flipper 229. If multiple recording is set, the record paper is led to the paper re-feeding path by the flipper 229 so as not to be conveyed up to the ejecting rollers 228. The record paper led to the paper re-feeding path is placed in the transfer section 226 at the above-mentioned timing.

Figure 4:
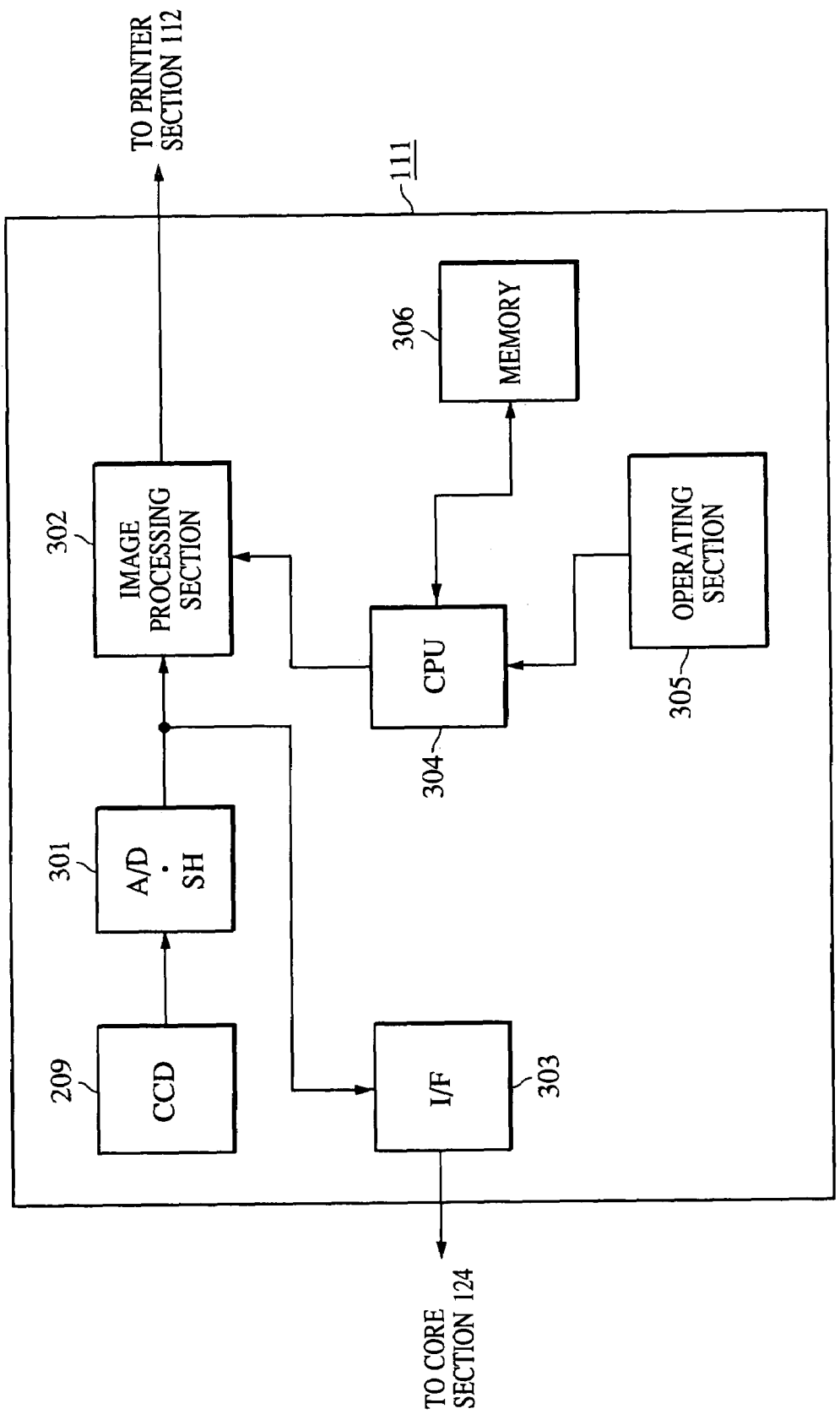
FIG. 4 is a block diagram showing an internal configuration of a reader section of the digital copying machine.

FIG. 4 is an functional illustration of the reader section 111. As illustrated, the reader section 111 includes an A/D·SH (shading) processing section 301 to which image data is supplied from the CCD 209, an image processing section 302 for conducting predetermined image processing on the output of the A/D·SH processing section 301, an interface (I/F) section 303 for the core section 124, an operating section 305 by means of which the user can enter instructions/commands, etc., a CPU 304 for wholly controlling the operation of the reader section 111 in accordance with the user's operation of the operating section 305, and a memory 306 for storing processing programs, various types of data and others for implementing the operational control in the CPU 304.

Image data outputted from the CCD 209 is analog/digital-converted and shading-corrected in the A/D•SH processing section 301. The image data processed in the A/D•SH processing section 301 is transferred through the image processing section 302 to the printer section 112 and further transferred through the I/F section 303 to the core section 124 of the image input/output control section 120.

The CPU 304 controls the image processing section 302 and the I/F section 303 in accordance with the contents the user has set in the operating section 305. For example, if the copying mode for trimming processing is set in the operating section 305, the CPU 304 makes the image processing section 302 conduct the trimming processing and then send the processed image data to the printer section 112. Additionally, if a facsimile transmission mode is set in the operating section 305, the CPU 304 sends, through the I/F section 303, image data and a control command corresponding to a fax mode set in the operating section 305 to the core section 124.

This control program for the CPU 304 is retained in the memory 306, and the CPU 304 implements the control for the aforesaid operations while referring to the memory 306. Additionally, the memory 306 is also used as a working area for the CPU 304.

Figure 5:
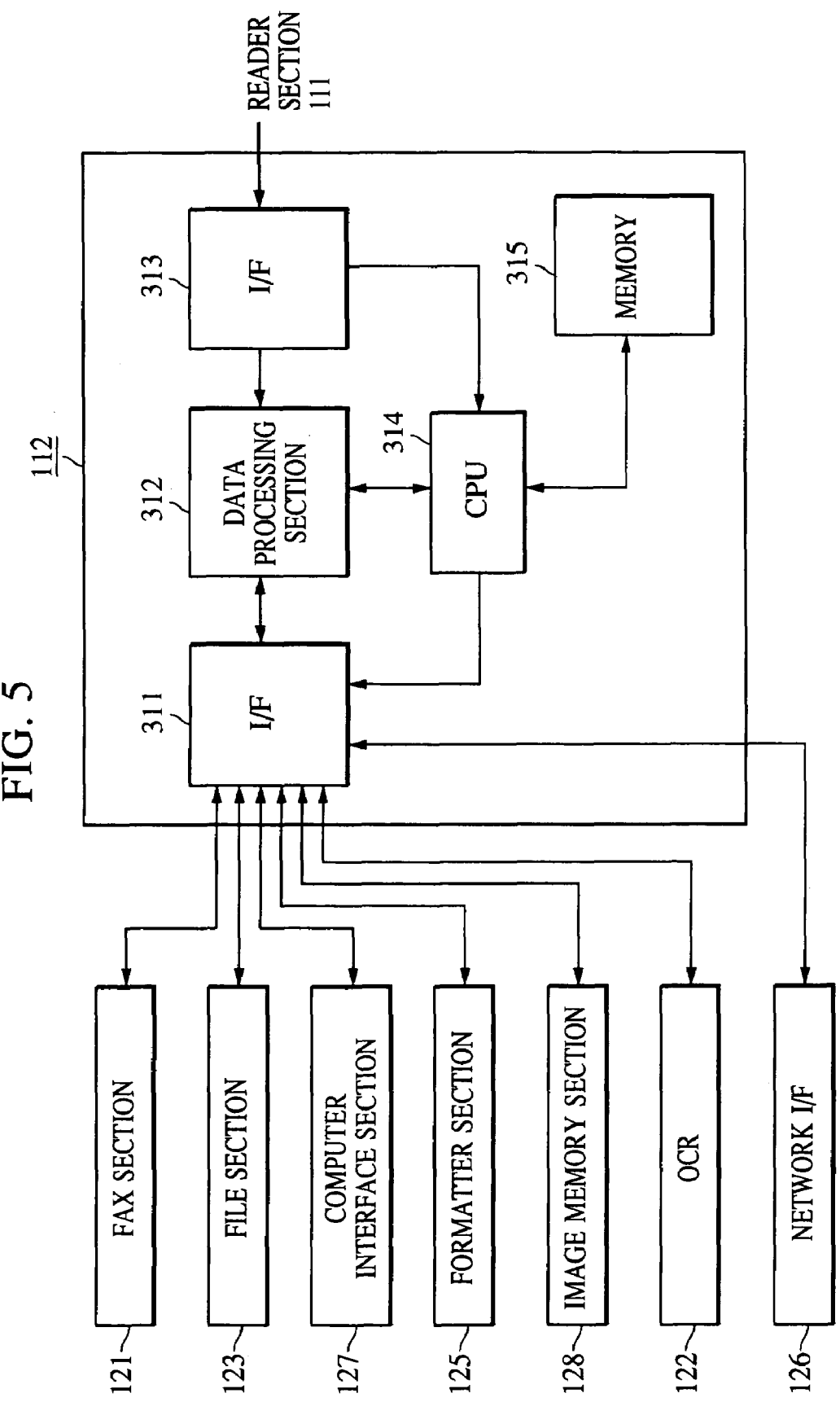
FIG. 5 is a block diagram showing an internal configuration of a printer section of the digital copying machine.

FIG. 5 is a functional illustration of the printer section 112. In this illustration, the printer section 112 includes an interface (I/F) section 311 connected to a FAX section 121, a file section 123, a computer I/F section 127, a formatter section 125, an image memory section 128, an OCR section 122 and a network I/F section 126 in the image input/output control section 120, an interface (I/F) section 313, connected to the reader section 111, a data processing section 312 for conducting predetermined image processing on image data supplied through the I/F section 311 or the I/F section 313, a CPU 314 for wholly implementing the operational control of the printer section 112 in accordance with a control command or the like supplied thereto from the reader section 111 through the I/F section 313, and a memory 315 for storing processing programs, various kinds of data or the like needed for when the CPU 314 performs the operational control.

The image data from the aforesaid reader section 111 is sent through the I/F section 313 to the data processing section 312, while the control command from the reader section 111 (a control command corresponding to a mode or the like set in the operating section 305 of the reader section 111) is sent through the I/F section 313 to the CPU 314.

The data processing section 312 is for conducting image processing, such as image rotating or variable magnification, on the image data from the reader section 111 under the control of the CPU 314 and sends the image-processed data through the I/F section 311 to the FAX section 121, the file section 123 and the computer I/F section 127.

Code data representative of an image supplied from the computer I/F section 127 through the I/F section 311 is transferred to the data processing section 312 and then transferred through the formatter section 124 to be evolved into image data. This image data is sent through the I/F section 311 to the data processing section 312 and subsequently given through the I/F section 311 to the FAX section 121 or other sections.

Furthermore, the image data supplied from the FAX section 121 through the I/F section 311 is handed over to the data processing section 312 and then transferred through the I/F section 311 to the file section 123, the computer I/F section 127 or other elements.

Still furthermore, the image data supplied from the file section 123 through the I/F section 311 is communicated to the data processing section 312 and then transferred through the I/F section 311 to the FAX section, the computer I/F section 127 or other elements.

The CPU 314 performs the control for the above-mentioned operations according to the control program stored in the memory 315 and the control command(s) transferred thereto from the reader section 111 through the I/F section 133. The memory 315 is used additionally as a working area for the CPU 314.

With the aforesaid configuration of the image input/output control section 120, the digital copying machine 110 can use the core section 124 of the image input/output control section 120 principally to compositely perform the processing based upon the functions such as the reading of an image from an original, the printing-out of the image, the transmission/receive of the image, the preservation of the image and the input/output of data from the computer.

Secondly, the outline of the following information retrieving methods 1 to 4 will be described hereinbelow as examples of retrieving a document the user wants through the digital copying machine 110.

[Information Retrieving Method 1 Involving an Operation on the Operating Section 305 of the Digital Copying Machine 100]

Figure 6:
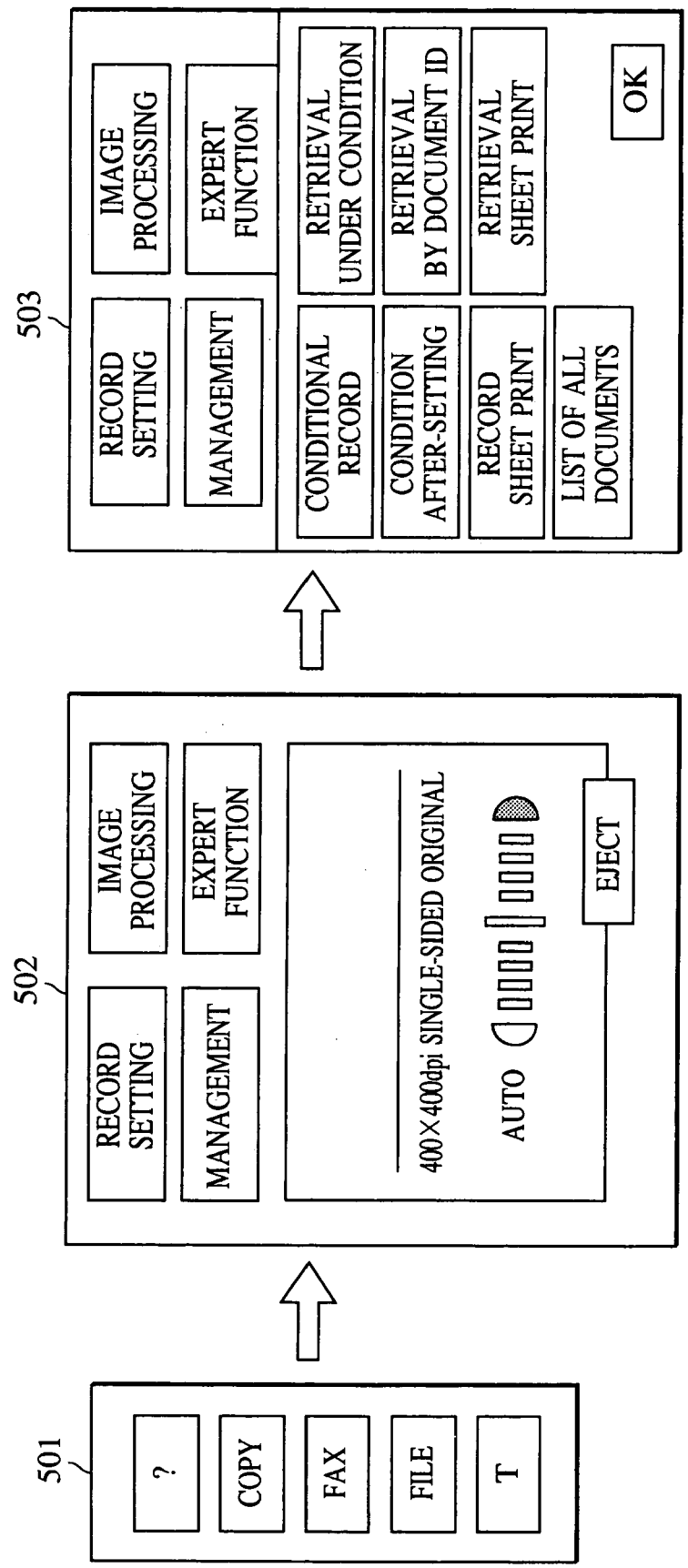
FIG. 6 is an illustration useful for describing the performance of a filing function in an operating section of the digital copying machine.

First of all, the user inputs password information, using for example a password input screen (not shown) in the operating section 305. Subsequently, in FIG. 6, the user selects "FILE", which puts the function (filing function) of the file section 123 in operation, from among a number of functional icons, including the icons "?", "COPY", "FAX", "FILE" and "T", on a screen (picture) 501 in the operating section 305. As a result of this selection, a screen 502 appears in the operating section 305 as shown in the same illustration. Following this, the user selects "EXPERT FUNCTION" on this screen 502, and a screen 503 for selection of a retrieving method appears in the operating section 305 as shown in the same illustration. Then, the user selects "RETRIEVAL UNDER CONDITION" on the screen 503, and a screen 504 for input of various kinds of conditions for retrieval of a desired document appears in the operating section 305, as shown in FIG. 7. The user inputs one or more condition(s) on the screen 504.

The information (keyword) input in this way, such as the password information and the various conditions for the information retrieval, is sent as an information retrieval request to the terminal unit 160 (a unit for managing information retrieval requests). Furthermore, as will be described in detail below, when the terminal unit 160 confirms the information retrieval request, the file section 123 implements document retrieval according to the aforesaid keyword. Accordingly, a document obtained as a retrieval result is displayed on a screen in the operating section 305 or is printed out from the printer section 112.

In addition, the terminal unit 160 issues a new password. In this case, a noticeable point is that the certification or check of the password and the issuance of the new password are centralized in management in the terminal unit 160, thereby preventing unnecessary dispersion of the password information.

In this instance, among the conditions the user can input on the screen 504 in FIG. 7, there are an MO disk name in the MO drive 130, a document name, a document number given to the document and the date of the update of the document. If an MO disk name is inputted as a condition, the file section 123 retrieves the documents in the disk corresponding to the inputted disk name through the MO drive 130 with a changer function which can control a plurality of MO disks (each of which will hereinafter be referred to simply as a disk). If a document name is inputted as a condition, it retrieves the document(s) corresponding to the inputted document name. If a document number is inputted as a condition, it retrieves the document(s) corresponding to the inputted document number. Furthermore, if an update date is inputted as a condition (requiring, e.g., that only documents updated after that date for only ones updated before it, or between two dates are eligible for retrieval in response to that request), it retrieves the documents in the disk accessed within the terms thereof.

Therefore, for example, if a disk name "0001" is inputted as a condition, a retrieval result appears on a screen 505 as shown in FIG. 8. When a desired document is selected on this screen 505 and the "PRINT" at a lower portion of the screen 505 is pressed, this document is printed out in the printer section 112.

[Information Retrieving Method 2 Using a Retrieval Sheet in the Digital Copying Machine 100]

In this case, a retrieval sheet 190 shown in FIG. 9 is put to use. This retrieval sheet 190 is made to be printed out at the registration of a document. In the retrieval sheet 190, information including a date, a document name and a disk name is printed in a document information section 512, while the aforesaid document information is marked in a marksheet section 521.

Accordingly, when retrieving a desired document through the use of the aforesaid retrieval sheet 190, the user marks password information in a retrieval password section 522 on the retrieval sheet 190 (i.e., marks the corresponding numbers of "1" to "0"), and marks, in an output setting section 511, to instruct whether or not the document indicated as a retrieval result is to be printed out (marks "YES" or "NO").

After the completion of the marking of various kinds of information on the retrieval sheet 190, the user makes the digital copy machine 110 fulfill the file function (file function mode) in the above-described way and makes it read the retrieval sheet 190. Accordingly, when recognizing, on the basis of sheet decision sections 515 to 520 on the retrieval sheet 190, that the inputted sheet is a retrieval sheet 190 and upon confirming that the right password information is set in the retrieval password section 522 on the retrieval sheet 190, the file section 123 transmits these contents as an information retrieval request to the terminal unit 160. Furthermore, as will be described in detail below, when the terminal unit 160 accepts the information retrieval request, the file section 123 uses the contents of the retrieval sheet 190 as a keyword and conducts a document retrieval on the basis of this keyword; therefore, the resultant document is displayed on a screen in the operating section 305 or is printed out from the printer section 112.

On the other hand, if confirming that the input sheet is not a retrieval sheet 190, the file section 123 makes a decision that the inputted sheet is a document-(an original or the like) whose contents are to be retained in a disk, and writes that document in a predetermined disk through the use of the MO drive 130. This predetermined disk signifies, when the user designates a disk in which the document is written (the designation is made by, for example, an operation in the operating section 305), the designated disk, whereas signifying, when no designation is made by the user, a predetermined preferential disk. After the completion of the document writing operation, the file section 123 gives "document name" to that document for the registration. Incidentally, "disk name", "disk number" and "date" are written and registered in advance. The information at this time is printed out as the retrieval sheet 190 from the printer section 112 to be used at the next document retrieval.

[Information Retrieving Method 3 Using a Retrieval Sheet in the Digital Copying Machine 100]

In this method, for the retrieval of a desired document, the retrieval sheet 190 (described above) is sent from the G3FAX 140 through facsimile transmission to the digital copying machine 110. Accordingly, before this is done, the user writes password information in the retrieval password section 522 in the retrieval sheet 190 and marks that he or she would like by FAX return (reply), the document obtained as a retrieval result, in the output setting section 511 (i.e., the user marks "FAX"), and further writes the fax number to which the reply FAX transmission should be sent, in a FAX return setting section 513. In addition, if needed, a desired FAX return time is written in a FAX reply (return) time setting section 514. Thus, the desired time for the receipt by the user of the document obtained as a retrieval result, can be specified from the retrieval requesting side.

When the above-mentioned contents of the retrieval sheet 190 are transmitted from the G3FAX 140 through a public circuit (or via any communications medium) to the digital copying machine 110, the FAX section 121 receives them. When a decision or determination is made, on the basis of the sheet decision sections 515 to 520 on the received sheet, that the received sheet is the retrieval sheet 190 and when a decision or determination is made that right password information is set in the password section 522 on the retrieval sheet 190, the FAX section 121 transfers the information on that retrieval sheet 190 to the file section 123. The file section 123 transmits the information from the FAX section 121 as an information retrieval request to the terminal unit 160. Furthermore, as will be described in detail below, if the terminal unit 160 accepts that information retrieval request, the file section 123 uses the information on the retrieval sheet 190 as a keyword, conducting a document retrieval according to the keyword. Accordingly, the resultant document is transmitted through the FAX section 121 to the facsimile receiver identified as the reply-receiving FAX in the FAX return setting section 513. Additionally, if needed, this transmission is made at the time written in the FAX reply time setting section 514.

On the other hand, if a decision is made that the received sheet is not a retrieval sheet 190, the FAX section 121 makes a decision that the received sheet has been received by ordinary FAX reception, and, in this case, hands over the received sheet information to the printer section 112 of the digital copying machine 110 for printing out.

Incidentally, although the OCR section 122 of the image input/output control section 120 can also read the FAX reply information written in the retrieval sheet 190 and identify it, if the OCR section 122 is not present, the reply or return is addressed to the number of the FAX transmitting the retrieval sheet 190 (in this case, the FAX number of the G3FAX 140). Additionally, in this case, after the completion of the retrieval in the file section 123, the reply transmission of the document which is the retrieval result, is made immediately.

Furthermore, in a case in which the file section 123 does not exist, even if the received sheet is a retrieval sheet 190, it is outputted from the digital copying machine 110 the same as an ordinary FAX reception.

[Method 4, for when a PC Makes the Digital Copying Machine 100 Conduct Information Retrieval]

For example, in a case in which the PC 170(a) performs an information retrieval, the user of the PC 170(a) inputs password information to his own PC 170(a). Also, in this case, as well as the information retrieving method 1 described above, the user inputs various conditions for the retrieval of a desired document on the screen 504 shown in FIG. 7.

The password information and the information (keyword) such as the various conditions for the retrieval of the document the user wants, are sent through the network 180 to the file section 123. The file section 123 transmits these sets of information as an information retrieval request to the terminal unit 160 (a unit which manages information retrieval requests). Furthermore, as will be described in detail below, when the terminal unit 160 accepts the information retrieval request, the file section 123 implements a document retrieval according to the keyword. The resultant retrieved document is sent through the network 180 to the PC 170(a).

The above description relates to the outline of the information retrieval request methods 1 to 4. As described above, all the information retrieval requests (various conditions or the like inputted for the retrieval of a desired document) from the users input according to these methods are once collected in the terminal unit 160, and the information manager confirms these retrieval requests and approves or rejects each of these retrieval requests, thereby accomplishing the integrated management of information. This integrated management will be described hereinbelow in detail.

Figure 10:
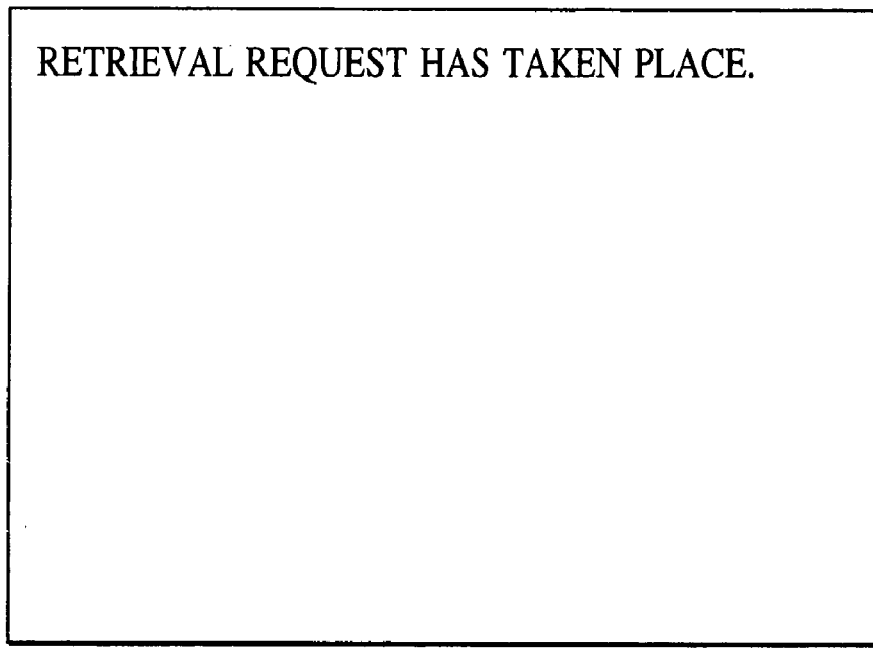
FIG. 10 is an illustration useful for describing a state in which a request for the information retrieval is communicated to a terminal unit which manages information retrieval requests.
Figure 11:
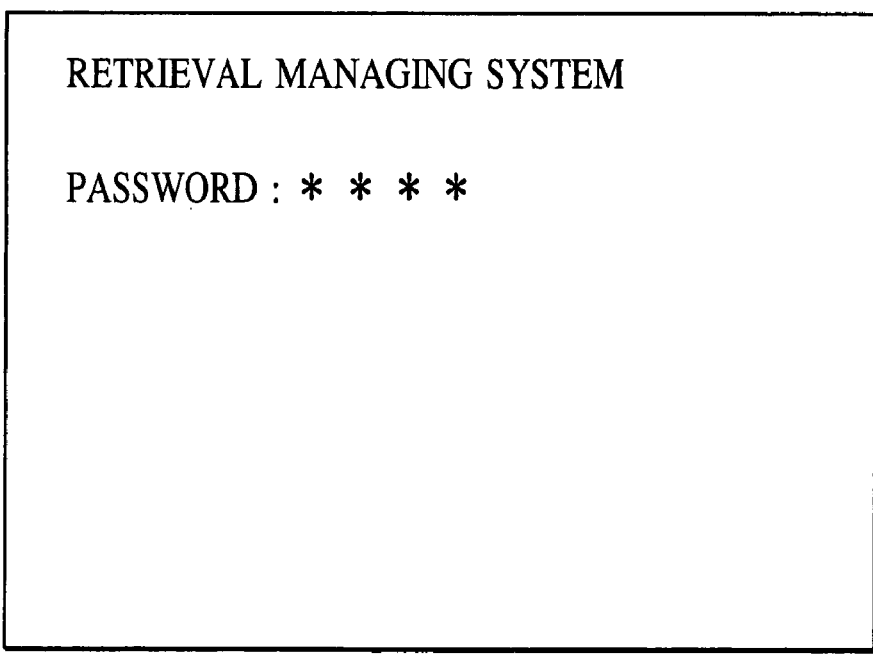
FIG. 11 is an illustration useful for describing an operation to be conducted when an information manager on the terminal unit side inputs a password.

When a retrieval request (information retrieval request according to the information retrieving method 1) input via the operating section 305 of the digital copying machine 110 or an information retrieval request (information retrieval request according to the information retrieving method 2) made by means of the input of a retrieval sheet 190 is given to the terminal unit 160, a screen 531 appears on a display of the terminal unit 160, as shown in FIG. 10. At this time, a password input screen 532 appears on the display of the terminal unit 160, as shown in FIG. 11. The information manager inputs a password on this screen 532. If the inputted password is correct, the contents of the retrieval request appears on a screen 533 as shown in FIG. 12. The information manager confirms the contents on the screen 533 and chooses "YES" (approval: permission for retrieval) or "NO" (rejection: no permission for retrieval).

If the selection on the screen 533 is "YES" (acceptance of request), information indicative of the selection of "YES" and information on the contents of the retrieval request are transferred to the file section 123 of the digital copying machine 110, where the above-described document retrieval is conducted. Accordingly, the printer section 112 of the digital copying machine 110 prints out a document corresponding to the retrieval request.

On the other hand, if the selection on the screen 533 is "NO" (non-acceptance of request), message information representative of the selection of "NO" is transmitted to the digital copying machine 110, and a rejection message screen 534 appears in the operating section 305 as shown in FIG. 13.

Furthermore, in the case of an information retrieval request (information retrieval request according to the information retrieving method 3) by the FAX transmission of a retrieval sheet 190 from the G3FAX 140, by means of the reply by the FAX section 121 of the digital copying machine 110, the contents of the retrieval sheet 190 are sent to the terminal unit 160. The information manager confirms the contents of the retrieval sheet 190 sent thereto, and in the case of accepting that request, writes information such as a retriever ID, a retrieval document name and the number of sheets in a FAX transmission report 535 with a fixed format acting as a document transmission guidance, shown in FIG. 14, and sends that information, together with the contents of the retrieval sheet 190, to the digital copying machine 110 facsimile transmission. Accordingly, in the digital copying machine 110, the FAX section 121 receives the information sent from the terminal unit 160 by the facsimile transmission, and document retrieval is conducted according to the contents thereof. Thereafter, the document obtained as a result of the retrieval, together with the FAX transmission report 535 in FIG. 14, is transmitted to the request issuer (G3FAX 140).

On the other hand, in the case of non-acceptance of the request, the information manager sends a FAX transmission report 536 with a fixed format acting as a document transmission no-permission guidance, shown in FIG. 15, to the digital copying machine 110 by FAX transmission. Accordingly, in the digital copying machine 110, the FAX section 121 receives the information about the FAX transmission report 536 sent from the terminal unit 160 by the FAX transmission, and communicates it to the request issuer (G3FAX 140).

Furthermore, in the case of an information retrieval request (information retrieval request according to the information retrieving method 4) by PC (in this case, the PC 170(a)) on the network 180, as well as the information retrieving methods 1 and 2 described above, screen 531 shown in FIG. 10 appears on a display of the terminal unit 160, and subsequently, screen 533, displaying the contents of the retrieval request, shown in FIG. 12 appears. The information manager confirms the contents on the screen 533 and selects "YES" or "NO".

If "YES" (acknowledgment of the request) is selected on the screen 533, information indicative of the selection of "YES" and information about the retrieval request contents are transferred to the file section 123 of the digital copying machine 110, and the document retrieval takes place as described above; therefore, the document requested is transmitted to the request-issuing PC 170(a).

On the other hand, if "NO" (no acknowledgment of the request) is selected, message information to this effect is sent through the digital copying machine 110 to the PC 170(a), and the rejection message screen 534 appears, as shown in FIG. 13.

The approval/rejection of the information retrieval request from the terminal unit 160 and the retrieval record, including the user who is making the information retrieval request and the result by the information manager or the like who permits it, are confirmable in the digital copying machine 110.

Concretely, for example, as mentioned above with reference to FIG. 6, the screen 501 including the functional icons of "?", "COPY", "FAX", "FILE" and "T" appears in the operating section 305 of the digital copying machine 110. If the user selects "FILE" on this screen 501, a screen 537 appears as shown in FIG. 16, and if the user selects "MANAGEMENT" on this screen 537, a screen 538 is displayed as shown in the same illustration. If the user selects "RETRIEVAL RECORD DISPLAY" on this screen 538, a screen 539 of a retrieval record list is displayed as shown in FIG. 17 so that the user can confirm the retrieval record.

In addition, the record about the scan, the printing, and any scanning jam or printing jam is also confirmable in the digital copying machine 110 to be utilized for accounting or the like.

As a concrete example, a screen 540 of record contents is shown in FIG. 18. For instance, if, on this screen 540, the user selects "SCAN" and touches "OK", the monthly scan frequency is displayed in a screen 541 as shown in FIG. 19. Subsequently, if, on the screen 541, the user selects "PAGE" and touches "OK", a screen showing the monthly numbers of pages appears, as shown in FIG. 20. Following this, if, on the screen 542, the user selects "SIZE" and touches "OK", a screen 543, showing the numbers of times of printing at various sizes, appears, as shown in FIG. 21.

Also in the case in which the user selects "PRINT" on the screen 540 in FIG. 18, information similar to that in the case of "SCAN" is obtainable.

Furthermore, if the user selects "SCAN JAM" and touches "OK" on the screen 540, a screen 544 showing the monthly numbers of times of jamming appears, as shown in FIG. 22. Likewise, if the user selects "PRINT JAM", information similar to that in the case of "SCAN JAM" is obtainable.

Incidentally, it is also appropriate (although not necessary) the foregoing record display takes place within a mode ("serviceperson mode") only service personnel can access.

The filing system 100 is designed such that, after the implementation of the foregoing information retrieval, the digital copying machine 110 itself produces a new password and sends it through the network 180 to the terminal unit 160 having a managing function. This configuration constitutes the most important feature of this embodiment.

Figure 23:
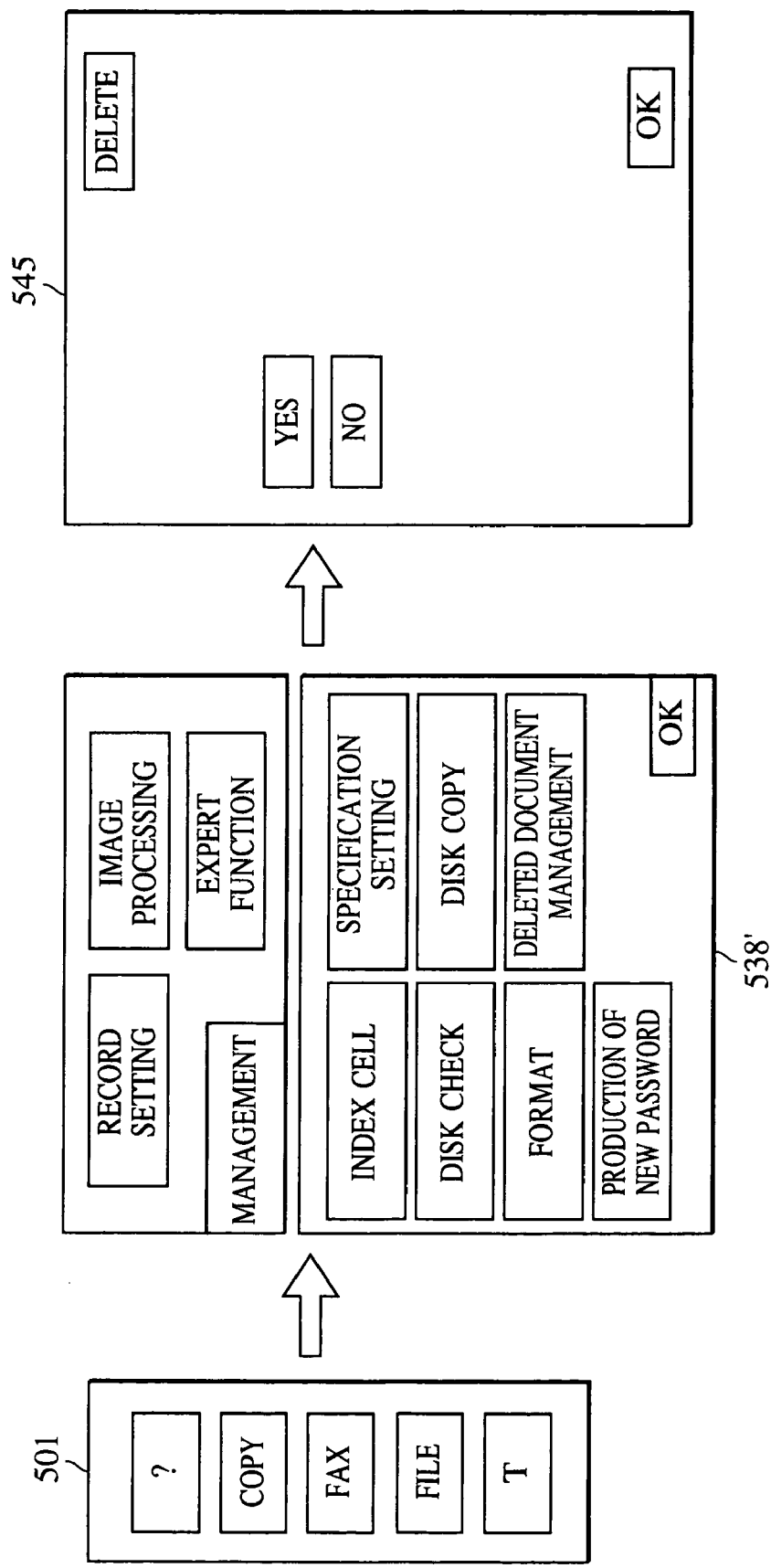
FIG. 23 is an illustration available for explaining an operation for setting a mode to issue a new password in the digital copying machine after the information retrieval.

That is, in the operating section 305 of the digital copying machine 110, as described above with reference to FIG. 16, if the user selects "FILE" on the screen 501 and selects "MANAGEMENT" on the next screen 537, screen 538 appears. At this time, as shown in FIG. 23, a screen 538' additionally including an item "PRODUCTION OF NEW PASSWORD" appears. If, on this screen 538', the user selects "PRODUCTION OF NEW PASSWORD", a screen 545 appears as shown in the same illustration. If, on this screen 545, the user selects "YES", a new password is thereby produced.

Incidentally, the setting of "MANAGEMENT"→"PRODUCTION OF NEW PASSWORD"→"YES" in the operating section 305 is made as a mode to be set on the condition of existence of recognition of the connection between the digital copy machine 110 (concretely, the image input/output control section 120) and the terminal unit 160.

In such a new-password production mode, for example, the screen 531 in FIG. 10 appears on a display of the terminal unit 160, and on the screen 533 in FIG. 12, the information manager selects "YES" (acceptance of a request) or "NO" (non-acceptance of the request) so that the corresponding information is given to the file section 123 of the digital copy machine 110. Accordingly, the file section 123 issues a new password with respect to the password for the information retrieval request (the password of the user who issued the present document retrieval request), and transmits the new password to the terminal unit 160.

Upon receipt of this transmission, as shown in FIG. 24, a screen 546 appears to indicate the issuance of the new password, and the information manager notifies the qualified user who made the information retrieval request, of that new password by means of word of mouth or electronic mail so that the user can use the new password-upon subsequent operations.

Thus, when the qualified user makes the next information retrieval request through the use of the new password, this information retrieval request is transferred to the terminal unit 160, and when the terminal unit 160 accepts this request, the digital copying machine 110 again issues a new password and sends it to the terminal unit 160. That is, at every information retrieval, a new password is issued by the digital copying machine 110.

The operation of the filing system 100 on an information retrieval request according to the information retrieving methods 1 to 4, including such a new-password production mode, is shown in the flow charts of FIGS. 25 to 29.

Figure 25:
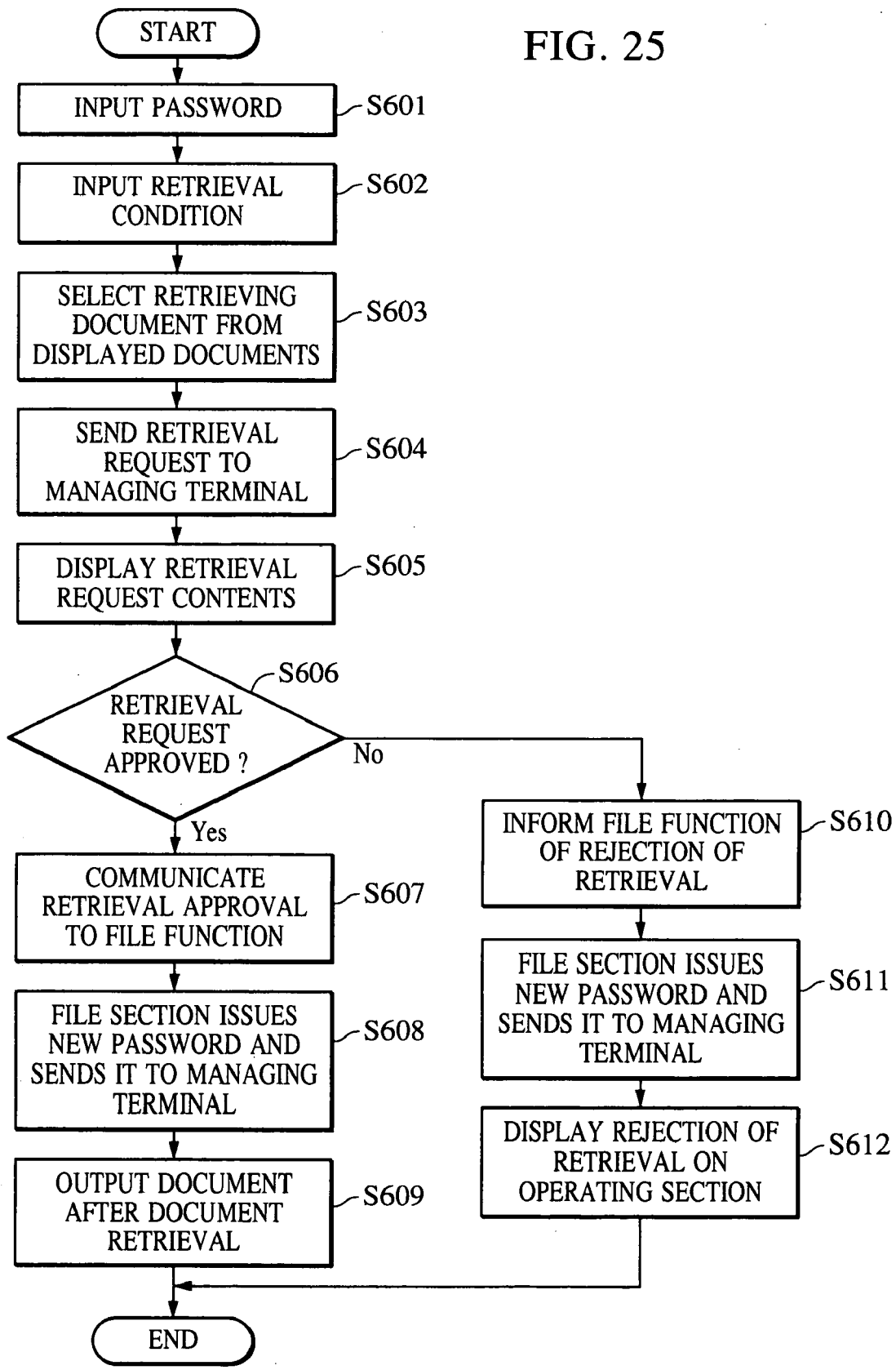
FIG. 25 is a flow chart useful for explaining the processing for information retrieval by means of an information retrieval request from the operating section, including a mode for issuing a new password.

[In the Case of an Information Retrieval Request According to Information Retrieving Method 1: see FIG. 25]

First of all, the user on the digital copying machine 110 side inputs password information on a password input screen in the operating section 305 (step S601). Then, the user inputs various conditions for retrieval of a desired document according to the operational screens, shown in FIGS. 6 and 7 (step S602). Subsequently, the user selects the desired document on the document selecting screen 505, shown in FIG. 8 (step S603).

The user's password information and the information (keyword) such as the various conditions for the information retrieval input in the digital copying machine 110 in this way are sent as an information retrieval request to the terminal unit 160 (step S604).

The screen 532 shown in FIG. 10 appears in the terminal unit 160, while the information manager on the terminal unit 160 side inputs the correct password using the screen 532 shown in FIG. 11, so that the screen 533 (the contents of the information retrieval request sent from the digital copying machine 110 in the step S604) shown in FIG. 12 appears in the terminal unit 160 (step S605).

The information manager on the terminal unit 160 side makes a decision, referring to the aforesaid screen 533, on whether or not to accept the retrieval request. If accepting the retrieval request, the information manager selects "YES", whereas, if not accepting it, the information manager selects "NO" (step S606).

If the selection of "YES" (acceptance of the retrieval) is made in the step S606, this selection result is transmitted from the terminal unit 160 to the file section 123 of the digital copying machine 110 (step S607).

Upon receipt of this notification from the terminal unit 160 in the step S607, the file section 123 implements a document retrieval in a manner that the contents of the information retrieval request input by the user in the steps S601 and S602 are used as a keyword, and further issues a new password to the terminal unit 160 (step S608). Accordingly, in the terminal unit 160, the screen 546 in FIG. 24 appears, and the information manager on the terminal unit 160 side notifies the qualified user, who issues the information retrieval request, of the new password displayed on the screen 546 by means of word of mouth or electronic mail, so that the user can use the new password for subsequent operations.

Furthermore, the file section 123 prints out the document obtained as a result of the document retrieval through the use of the printer section 112 (step S609). Thereafter, this processing comes to an end.

On the other hand, if the selection in the step S606 shows "NO" (rejection of the retrieval), this "NO" selection is given from the terminal unit 160 to the file section 123 of the digital copying machine 110 (step S610).

The file section 123 issues a new password and notifies the terminal unit 160 of the new password without performing the document retrieval (step S611). Following this, in the operating section 305 of the digital copying machine 110, the screen 534 in FIG. 13, representative of the rejection of the retrieval request, appears (step S612), and this processing comes to an end.

Figure 26:
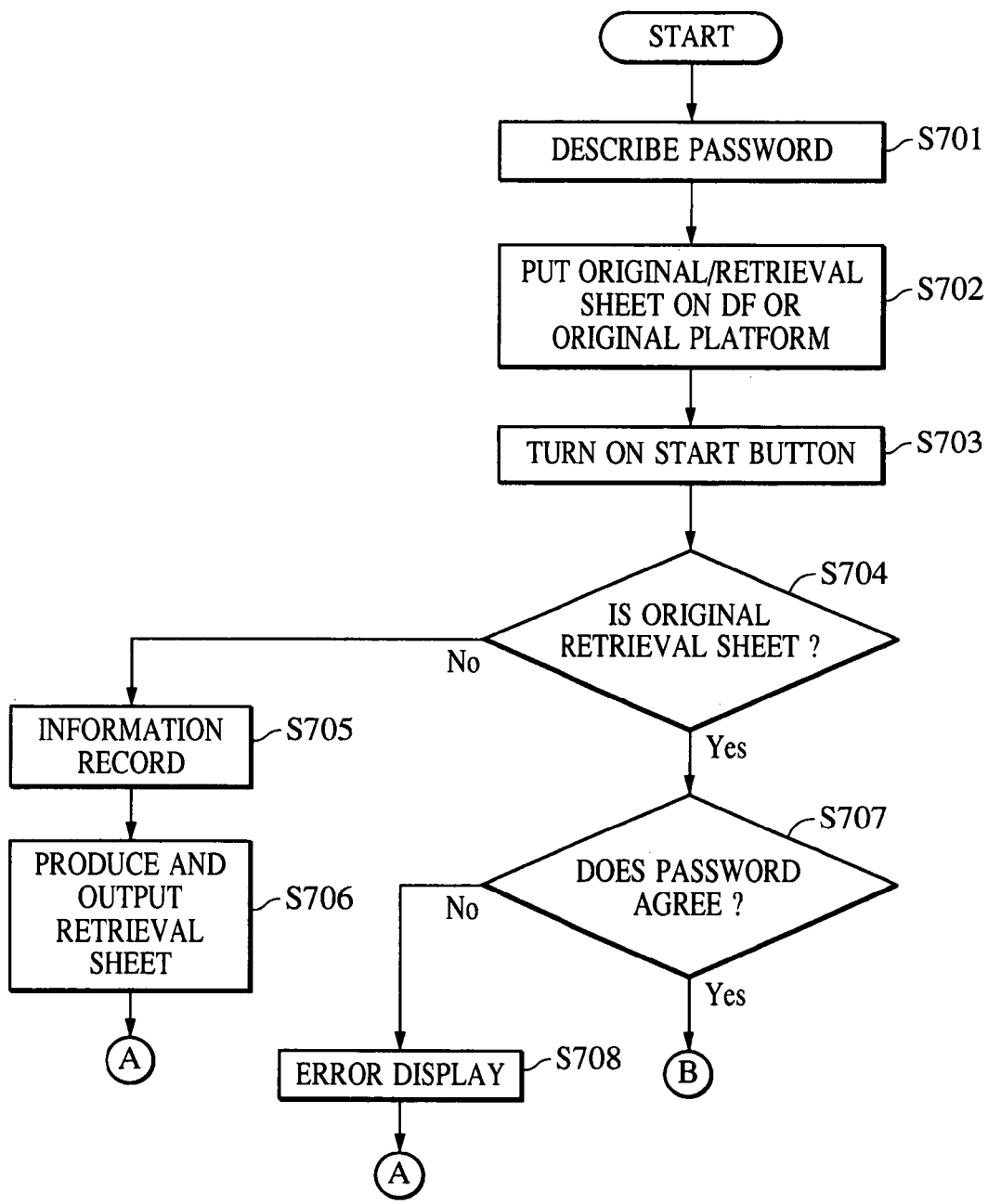
FIG. 26 is a flow chart (steps S701 to S708) useful for explaining the processing for information retrieval by means of an information retrieval request from the retrieval sheet, including a mode for issuing a new password.
Figure 27:
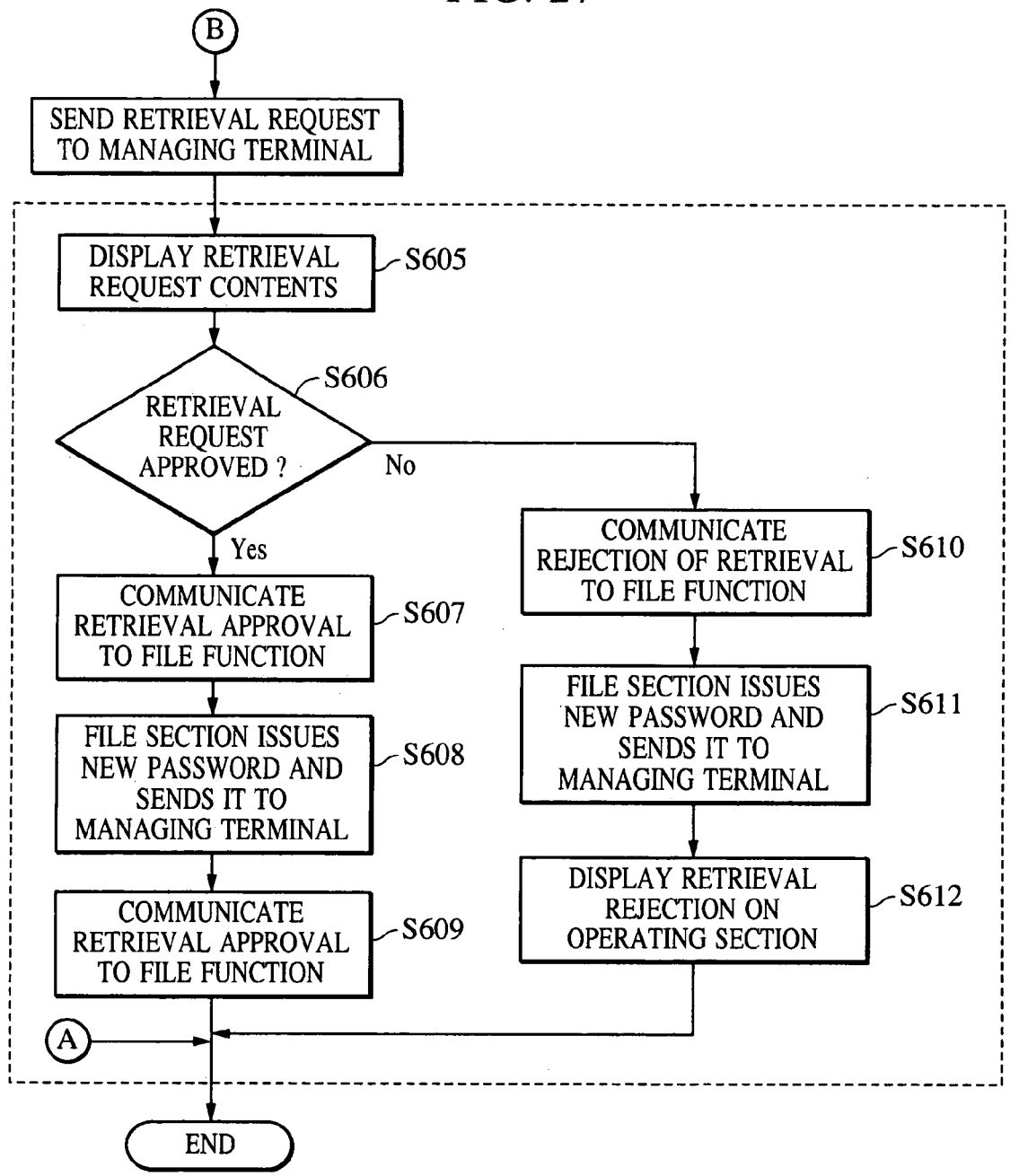
FIG. 27 is a flow chart (steps S605 to S612) useful for explaining the processing for information retrieval by means of an information retrieval request from the retrieval sheet, including a mode for issuing a new password.

[In the Case of an Information Retrieval Request According to Information Retrieving Method 2: see FIGS. 26 and 27]

First of all, the user on the digital copying machine 110 writes various kinds of information such as a password in the retrieval sheet 190 in FIG. 9 (step S701). Then, the user puts that retrieval sheet 190 on the original platform of the reader section 111 of the digital copying machine 110 (step S702). Subsequently, the user turns on a start button (not shown) in the operating section 305 (step S703), so that the information described in the retrieval sheet 190 is read Out by the digital copying machine 110 and transferred to the file section 123.

The file section 123 makes a decision, on the basis of the sheet decision sections 515 to 520 in the retrieval sheet 190, as to whether or not the inputted sheet is a retrieval sheet 190 (step S704).

If the decision result of the step S704 shows a retrieval sheet, the file section 123 makes a decision as to whether or not the correct password information is set in the retrieval password section 522 in the retrieval sheet 190 (step S707).

If the decision of the step S707 shows that the password in the retrieval sheet 190 is correct, the file section 123 transmits the information in the retrieval sheet 190 as an information retrieval request to the terminal unit 160 (step S709).

After this, steps similar to steps S605 to S612 in FIG. 25 are conducted, and this processing comes to an end.

On the other hand, if the decision of the step S704 does not show a retrieval sheet 190, the file section 123 recognizes that the input sheet is a document (an original or the like) to be preserved in a disk, and writes that document in a predetermined disk through the use of the MO drive 130 (step S705).

Furthermore, the file section 123 writes a "document name" corresponding to that document and registers it, and makes the printer section 112 print out that result as the retrieval sheet 190 (step S706). Thereafter, this processing terminates.

Also, if the decision of the step S707 indicates the password in the retrieval sheet 190 is incorrect, a message to this effect is displayed in the operating section 305 of the digital copying machine 110 (step S708). Thereafter, this processing terminates.

Figure 28:
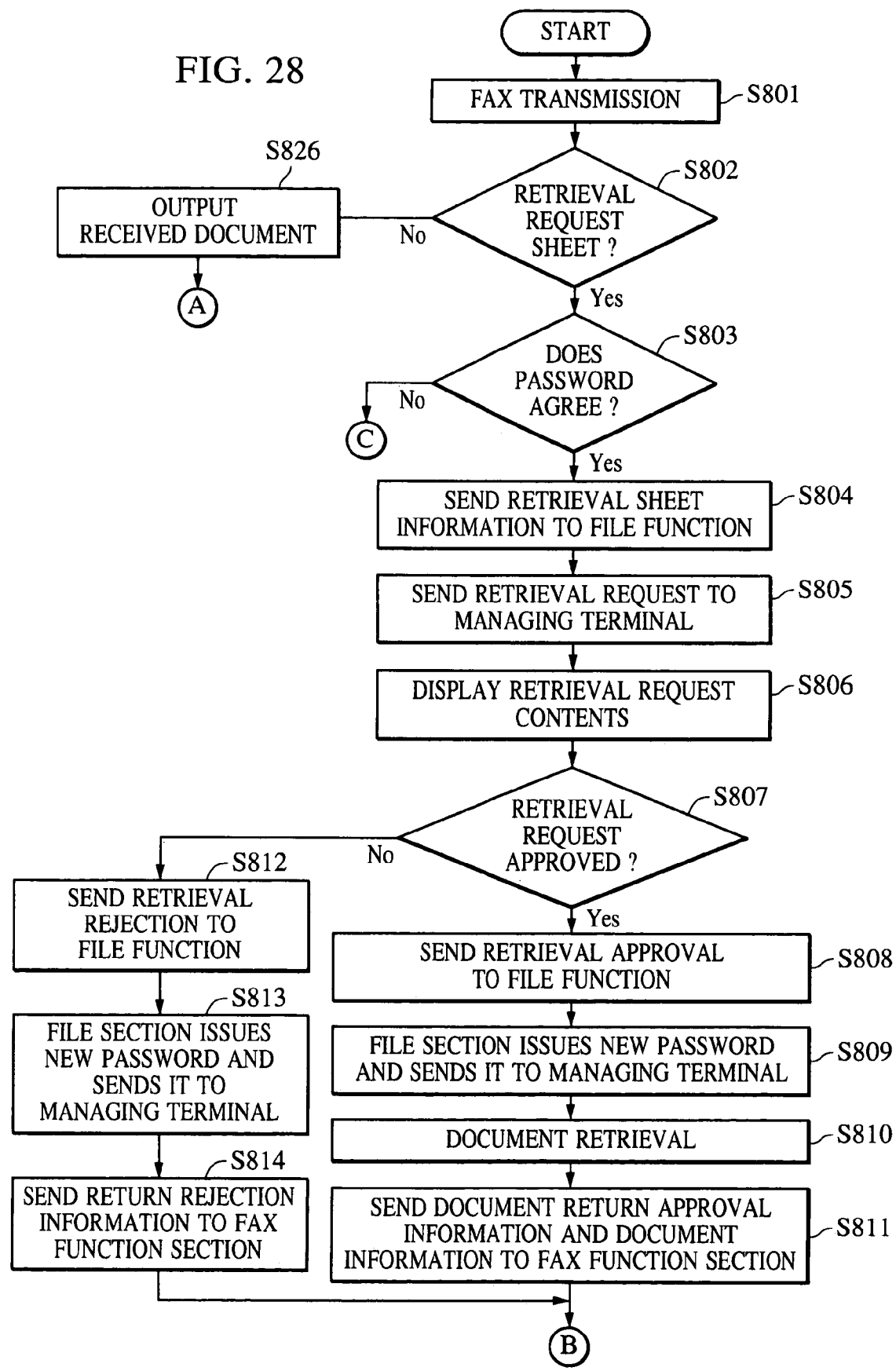
FIG. 28 is a flow chart (steps S801 to S814, S826) useful for explaining the processing for information retrieval by means of an information retrieval request made through a facsimile transmission, including a mode for issuing a new password.
Figure 29:
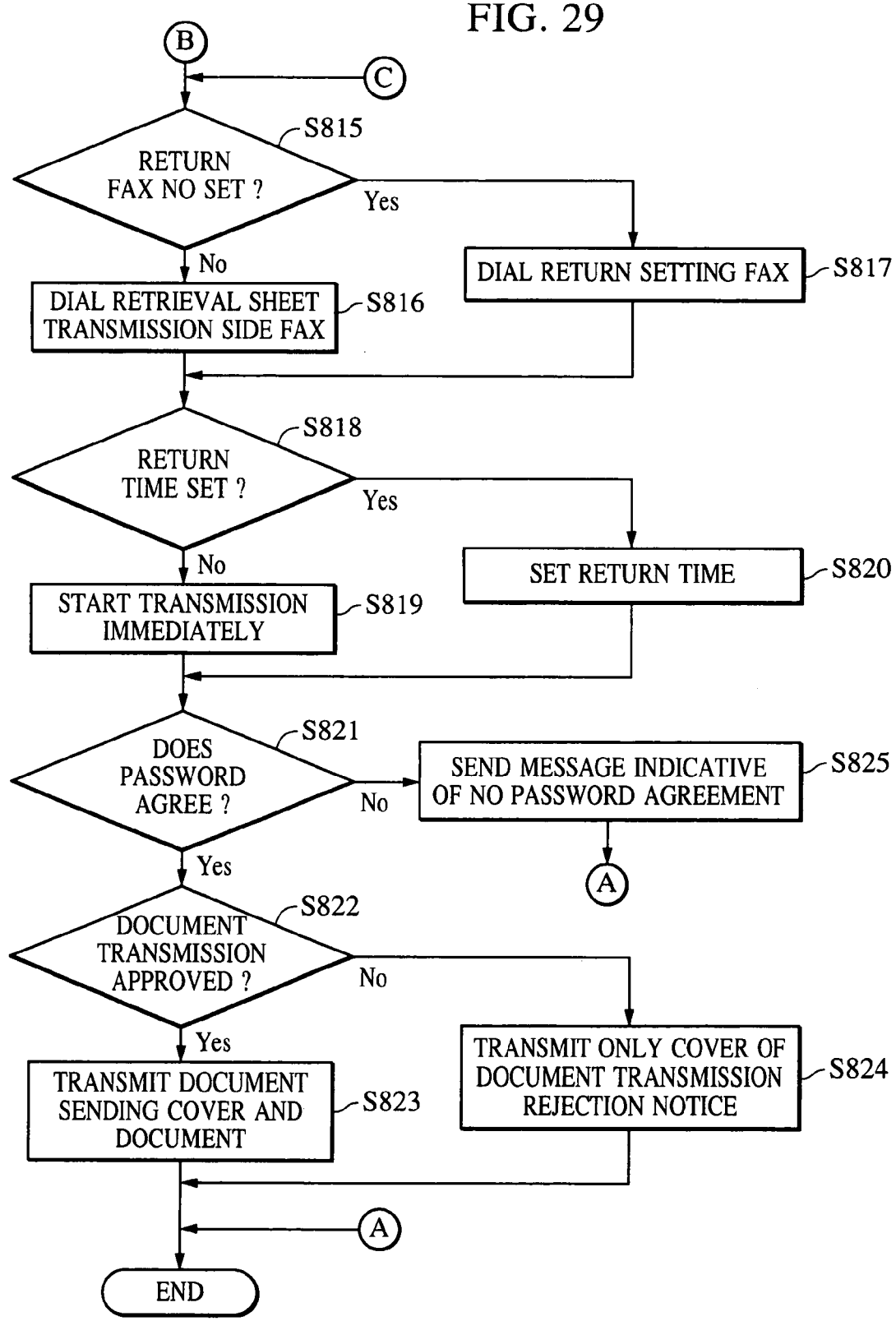
FIG. 29 is a flow chart (steps S801 to S814, S826) useful for explaining the processing for information retrieval by means of an information retrieval request made through a facsimile transmission, including a mode for issuing a new password.

[In the Case of an Information Retrieval Request According to Information Retrieving Method 3: see FIGS. 28 and 29]

First of all, the user on the G3FAX 140 describes various kinds of information, such as a password, in the retrieval sheet 190 in FIG. 9, and sends it to the digital copying machine 110 by FAX transmission. The FAX section 121 of the digital copying machine 110 receives it (step S801).

The FAX section 121 makes a decision, on the basis of the sheet decision sections 515 to 520 in the received sheet, as to whether or not the received sheet is a retrieval sheet 190 (step S802).

If the decision of the step S802 indicates the retrieval sheet 190, the FAX section 121 makes a decision as to whether or not the correct password information is set in the retrieval password section 522 of the retrieval sheet 190 (step S803).

If the decision of the step S803 indicates that the password written in the retrieval sheet 190 is incorrect, the FAX section 121 makes the printer section 112 of the digital copying machine 110 print out the received sheet as if it were an ordinary FAX reception (step S826). Thereafter, this processing comes to an end.

On the other hand, if the decision of the step S803 indicates that the password in the retrieval sheet 190 is correct, the FAX section 121 transfers the information in the retrieval sheet 190 as an information retrieval request to the file section 123 (step S804). The file section 123 transmits that information retrieval request to the terminal unit 160 (step S805).

In the terminal unit 160, the screen 531 in FIG. 10 to the effect of the transmission of the information retrieval request appears, and when the information manager on the terminal unit 160 side inputs a correct password through the screen 532 in FIG. 11, screen 533, shown in FIG. 12 (the contents of the information retrieval request sent from the digital copying machine 110 in the step S805), is displayed in the terminal unit 160 (step S806).

The information manager on the terminal unit 160 side makes a decision, by reference to screen 533, as to whether or not to accept the retrieval request (step S807).

If the decision of the step S807 is made to accept the retrieval request, the information manager sends the FAX transmission report 535 in FIG. 14, together with the information on the information retrieval request, to the digital copying machine 110 by FAX transmission. Accordingly, in the digital copying machine 110, the FAX section 121 receives the information (the information on the information retrieval request and the FAX transmission report 535) coming from the terminal unit 160 through the FAX transmission, and hands it over to the file section 123 (step S808).

The file section 123 conducts a document retrieval using the contents of the information retrieval request as one or more keywords, issues a new password and notifies the terminal unit 160 of this new password (step S809). Thus, the information manager on the terminal unit 160 side notifies the qualified user who requested the information retrieval, of the new password.

In addition, the file section 123 transfers the document forming the retrieval result in the step S810, together with the information on the information retrieval request and the information of the FAX transmission report 535, to the FAX section 121 (step S811).

On the other hand, if the decision of the step S807 results in the rejection of the retrieval request, the information manager sends the FAX transmission report 536 in FIG. 15, together with the information about the information retrieval request, to the digital copying machine 110 by FAX transmission. Accordingly, in the digital copying machine 110, the FAX section 121 receives the information (the information about the information retrieval request and the information of the FAX transmission report 536) FAX-transmitted from the terminal unit 160 and hands it over to the file section 123 (step S812).

The file section 123 recognizes that the retrieval request has been rejected, on the basis of the contents of the FAX transmission report 536 from the FAX section 121, issues a new password without conducting information retrieval, and notifies the terminal unit 160 of the new password (step S813). Furthermore, the file section 123 communicates, to the FAX section 121, information to the effect that the retrieval request has been rejected (step S814).

After the processing in the step S811 or S814, the FAX section 121 makes a decision, on the basis of the contents of the information retrieval request (the contents of the retrieval sheet 190) received in the step S812, as to whether a reply-receiving FAX number is set or not (whether or not a description exists in the reply-receiving FAX setting section 513) (step S815).

If the decision of the step S815 shows the setting of a reply-receiving FAX number, the FAX section 121 stores the set FAX number (step S817).

On the other hand, if the decision of the step S815 indicates no a reply-receiving FAX number, the FAX section 121 stores the number of the retrieval sheet 190 transmitting FAX received in the step S801 (in this case the number of the G3FAX 140) (step S816).

After the processing in the step S816 or 817, the FAX section 121 makes a decision, on the basis of the contents of the information retrieval request (the contents of the retrieval sheet 190) received in the step S812, as to whether a reply (return) time is set or not (whether or not a description exists in the FAX reply time setting section 514) (step S818).

If the decision of the step S818 indicates the setting of a reply time, the FAX section 121 sets that set time as a dialing time (step S820).

On the other hand, if the decision of the step S818 indicates no setting of a reply time, the FAX section 121 sets the present time as a dialing time (step S819).

After the processing in the step S819 or S820, when the dialing time comes, the FAX section 121 makes a decision on whether the password of that information retrieval request is correct or not (step S821).

If the decision of the step S821 indicates incorrect password, the FAX section 121 dials the FAX number that was stored in the step S816 or S817, to send the information indicative of the improper password thereto by FAX transmission (step S825). Thereafter, this processing comes to an end.

On the other hand, if the decision of the step S821 shows that the password is correct, the FAX section 121 makes a decision, on the basis of the information from the file section 123 in the step S811 or S814, as to whether the transmission of the retrieved document in response to that information retrieval request is permitted or not (step S822).

If the decision of the step S822 indicates permission for the transmission of the retrieved document, the FAX section 121 dials the FAX number that was stored in the step S816 or S817 to send the information of the FAX transmission report 535 in FIG. 14, together with the information regarding the retrieved document (information given from the file section 123), thereto by FAX transmission (step S823). Thereafter, this processing comes to an end.

On the other hand, if the decision of the step S822 shows no permission for the transmission of the retrieved document, the FAX section 121 dials the FAX number that was stored in the step S816 or S817 to send the information on only the FAX transmission report 536 (the information from the file section 123 in the step S814) thereto by FAX transmission (step S824). Thereafter, this processing comes to an end.

Incidentally, information retrieving method 4 (the information retrieval request from a PC) is similar to information retrieving method 1 (the information retrieval request from the operating section 305 of the digital copying machine 110), and detailed description thereof will be omitted for brevity.

As described above, according to this embodiment, in the digital copying machine 110, after the retrieval processing according to the information retrieval request from the user, a new password is issued at random, and the previous password is made invalid whereas the new password now becomes valid. Additionally, this new password is communicated to the qualified operator of the digital copying machine 110 who issued the information retrieval request.

Thus, with the configuration in which a password needed for the information retrieval is changed at every information retrieval, even in the case of a filing system which manages a large volume of information and accepts various information retrieving methods, improper leakage of the information to unauthorized persons is preventable with reliability, and the reliability of the information management is improvable.

In the above-described embodiment, a new password the file section 123 issues is sent to a terminal unit, and a manager who manages managing terminals informs each user of the new password. However, it is also appropriate that a the new password is given to each user in a system meeting a document retrieval request mode.

In the case of a retrieval request from a control panel and in the case of a retrieval request (local retrieval request) made in a manner that a retrieval sheet is read by the reader section 111, a new password is sent to a managing terminal and further is displayed on a displaying section of the control panel.

On the other hand, in the case of a retrieval request sent from the terminal unit 170 on the network 180 through the network 180 and in the case of a retrieval request (remote retrieval request) by a FAX document, a new password is forwarded to a managing terminal but not displayed on the control panel, unlike the local retrieval request.

Thus, the information on the new password is correctly transmittable to the user.

Furthermore, in the above-described embodiment, after a retrieval request including a retriever ID and a password is sent to the terminal unit 160, the information manager on the terminal unit 160 side checks or confirms the retrieval request manually. However, it is also appropriate that the terminal unit 160 confirms the retrieval request automatically rather than manually.

In this case, the correspondence or correlation between the retriever ID and the password is stored in a database on the terminal unit 160 side and, upon receipt of a retrieval request, a check is made by reference to the contents of the database on the basis of the received retriever ID and password. Following this, a new password is produced using a predetermined algorithm, such as random numbers, to update the contents of the database.

In addition, it is also acceptable that a respective document range which can be disclosed to the hold of each particular retriever ID is set and registered in the database, and a decision is made as to whether the document requested for the retrieval can be disclosed or not.

Moreover, naturally, the objects of these embodiments are achievable in a manner that a record medium storing a software program code for realizing the functions of the host and the terminal in the above-described embodiment is supplied to a system or an apparatus and the program code is read out from the record medium by a computer (or a CPU, an MPU) of the system or the apparatus to implement the functions.

In this case, the program code itself read out from the record medium realizes the functions in these embodiments, and the record medium storing this program code constitutes an aspect of this invention.

The record mediums for the supply of the program code include a ROM, a floppy disk, a hard disk, an optical disk, a magneto-optical disk, a CD-ROM, a CD-R, a magnetic tape, a nonvolatile memory card and others.

In addition, naturally, in addition to realizing the functions in these embodiments by implementing the program code read out by the computer, for the realization of the functions of this embodiment, this invention covers an OS or the like operating on the computer conducting a portion of or all of the actual processing according to that program code.

Still-additionally, this invention covers an approach in which the program code read out from the record medium is written in a memory provided in a function-extending board incorporated into a computer or in a function-extending unit connected to the computer and a CPU or the like provided in the function-extending board or the function-extending unit conducts a portion of or all of the actual processing in accordance with the program code to realize the functions of these embodiments.

As described above, in these embodiments, a new password is issued at every fulfillment of a predetermined information processing function (information retrieving function or the like) so that the new password is accepted as the effective password in the next fulfillment of the information processing function, and the previous password is made invalid.

Concretely, in a digital copying machine combining a filing function, an OCR function, a facsimile function and a network function, after the implementation of the information retrieval requested from the user through the use of a password, such as an information retrieval requirement (information retrieval request) made through its operating section, an information retrieval requirement by an information retrieval sheet sent from the external by facsimile transmission or an information retrieval requirement by a personal computer on a network, a new password is issued at random, and the previous password is made invalid. This new password is sent to the managing unit on the network and communicated to the qualified user of the digital copying machine. Accordingly, for requesting an information retrieval, the user must use this new password, and otherwise, that information retrieval requirement is not accepted in the digital copying machine.

In addition, it is also appropriate that the information manager on the managing unit side confirms the contents of the information retrieval request input to the digital copying machine, and the digital copying machine conducts the information retrieval according to the confirmation result (acceptance or no acceptance of the request).

Thus, according to these embodiments, it is possible to certainly prevent improper leakage of the information to unauthorized persons or the like and to surely keep secret confidential information, which can enhance the reliability of the information management.

What is claimed is:

1. An apparatus for conducting a retrieval of document data, comprising:
    storing means for storing the document data;
    a receiver, for receiving from a user a request for retrieval of the document data, with the request including a password;
    a transmitter, for transmitting the password, received by said receiver, to a managing unit on a network;
    deciding means for, when said managing unit confirms the password transmitted by said transmitter, receiving a confirmation result from said managing unit to decide, on the basis of said confirmation result, whether or not the user is an authorized user;
    retrieving means for retrieving the document data stored in said storing means according to a decision result obtained by said deciding means;
    outputting means for outputting document data retrieved by said retrieving means;
    issuing means for automatically issuing a new password in response to receiving from a user a request for retrieval of the document data by said receiver, wherein the user is notified of the new password if the user is authorized; and
    registering means for transmitting the new password, issued by said issuing means, to said managing unit to register the new password as a valid password.

2. An apparatus according to claim 1, wherein said receiver includes a local receiver for receiving a request from the user, if a local user, and a remote receiver for receiving a request sent from the user, if a remote user, through a network.

3. An apparatus according to claim 2, further comprising a control panel for performing a predetermined display in response to a key operation by the user, wherein said local receiver receives a retrieval request and a password inputted from said control panel.

4. An apparatus according to claim 2, further comprising a reader, for reading an original to produce image information, wherein said local receiver receives a retrieval request and a password extracted from the image information taken by said reader.

5. An apparatus according to claim 2, wherein said remote receiver receives a retrieval request and a password sent from a terminal through a network.

6. An apparatus according to claim 2, wherein said remote receiver receives a retrieval request and a password extracted from image information sent from a terminal through a network.

7. An apparatus according to claim 2, further comprising a facsimile receiver for receiving a facsimile image, wherein said remote receiver receives a document da retrieval request and a password extracted from an image which said facsimile receiver receives.

8. An apparatus according to claim 2, wherein said outputting means outputs document data in a different manner in accordance with whether said receiver behaves as said local receiver or said remote receiver.

9. An apparatus according to claim 8, further comprising a facsimile transmitter for conducting a facsimile transmission to a predetermined address, wherein said outputting means, when a retrieval request is receive through a facsimile reception, transmits document data retrieved by said retrieving means in the form of a facsimile image to a retrieval requesting facsimile unit through the use of said facsimile transmitter.

10. An apparatus for conducting a retrieval of document data, comprising:
    storing means for storing the document data;
    a receiver, for receiving a request for a retrieval of the document data, including a password, from a user;
    confirming means for confirming authorization of the user through the use of the password which said receiver receives;
    retrieving means for retrieving the document data stored in said storing means on the basis of a confirmation result by said confirming means;
    outputting means for outputting document data retrieved by said retrieving means;
    issuing means for issuing a new password automatically in response to a receiving operation of said receiving means, wherein the user is notified of the new password if the user is authorized; and
    notifying means for notifying the user of the new password issued by said issuing means in a mode corresponding to a mode taken for when said receiver receives said retrieval request.

11. An apparatus according to claim 10, wherein said receiver includes a local receiver for receiving a request from the user, if a local user, and a remote receiver for receiving a request sent from the user, if a remote user, through a network, and, for notification, said notifying means conducts a display on a control panel when said local receiver receives the request.

12. An apparatus according to claim 11, wherein said local receiver receives a retrieval request and a password input from said control panel.

13. An apparatus according to 11, further comprising a reader, for reading an original to produce image information, with said local receiver receiving a retrieval request and a password extracted from the image information produced by said reader.

14. An apparatus according to claim 11, wherein said notifying means makes a notification through a network when said remote receiver receives the request.

15. An apparatus according to claim 14, wherein said remote receiver receives a retrieval request and a password sent from a terminal through a network.

16. An apparatus according to claim 14, wherein said remote receiver receives a retrieval request and a password extracted from image information sent from a terminal through a network.

17. An apparatus according to claim 14, further comprising a facsimile receiver for receiving a facsimile image, with said remote receiver receiving a document data retrieval request and a password extracted from an image received through said facsimile receiver.

18. A processing method of conducting a retrieval of document data, comprising the steps of:
receiving a document data retrieval request, including a password, from a user;
transmitting the password to a managing unit on a network;
receiving from the managing unit a confirmation result relating to validity of the transmitted password to decide, on the basis of said result, whether or not the user is an authorized user;
retrieving the stored document data on the basis of a result of the decision;
outputting a result of the retrieval;
issuing a new password automatically, in response to receiving from a user a request for retrieval of the document data, wherein the user is notified of the new password if the user is authorized; and
transmitting the new password to the managing unit to register the new password as a valid password.

19. A processing method according to claim 18, wherein the reception of said password in said reception step includes local reception for receiving a request from the user, if a local user, and remote reception for receiving a request from the user, if a remote user, through a network.

20. A processing method according to claim 19, wherein, in said local reception, a retrieval request and the password, inputted through a control panel, are received.

21. A processing method according to claim 19, further comprising the step of reading an original to produce image information, with said local reception being conducted to receive a retrieval request and a password extracted from the image information.

22. A processing method according to claim 19, wherein said remote reception is conducted to receive a retrieval request and a password sent from a terminal through a network.

23. A processing method according to claim 19, wherein said remote reception is made to receive a retrieval request and a password extracted from image information sent from a terminal through a network.

24. A processing method according to claim 19, further comprising the step of receiving a facsimile image through a facsimile receiver, with said remote reception being conducted to receive a document data retrieval request and a password extracted from the received facsimile image.

25. A processing method according to claim 19, wherein said retrieval result is outputted in a different manner in accordance with whether said password is received by way of said local reception or said remote reception.

26. A processing method according to claim 19, further comprising the steps of performing a facsimile transmission to a predetermined address through the use of a facsimile transmitter, and, when a retrieval request is received by facsimile reception, transmitting a retrieval result in the form of a facsimile image to a retrieval requesting facsimile unit through the use of the facsimile transmitter.

27. A processing method of conducting a retrieval of document data, comprising the steps of:
receiving a request for a retrieval of the document data, including a password, from a user;
confirming that the user is authorized, on the basis of the received password;
retrieving the document data, stored, on the basis of a result of the confirmation;
outputting a result of the retrieval;
issuing a new password automatically in response to a receiving operation of the retrieval request, wherein the user is notified of the new password if the user is authorized; and
notifying the user of the new password in a mode corresponding to a mode taken at the reception of said retrieval request.

28. A processing method according to claim 27, wherein the reception of said retrieval request includes local reception for receiving a request from the user, if a local user, and remote reception for receiving a request from the user, if a remote user, through a network, and the notification of the password is made by displaying the password on a control panel when the request takes place by said local reception.

29. A processing method according to claim 28, wherein said local reception is conducted to receive a retrieval request and a password inputted through the control panel.

30. A processing method according to claim 28, further comprising the step of reading an original to produce image information, with said local reception being conducted to receive a retrieval request and a password extracted from the image information.

31. A processing method according to claim 28, wherein the notification of the password is effected through a network when the request takes place by said remote reception.

32. A processing method according to claim 31, wherein said remote reception is conducted to receive a retrieval request and a password sent from a terminal through a network.

33. A processing method according to claim 31, wherein said remote reception is conducted to receive a retrieval request and a password extracted from image information sent from a terminal through a network.

34. A processing method according to claim 31, further comprising the step of receiving a facsimile image, with said remote reception being conducted to receive a document data retrieval request and a password extracted from the received facsimile image.

35. A computer readable record medium storing a computer program to be run by a computer of a processing unit for retrieving document data, said computer program comprising the steps of
receiving a request for a retrieval of the document data, including a password, from a user;
transmitting the received password to a managing unit on a network;
receiving from the managing unit a confirmation result of validity of the transmitted password to decide, on the basis of the confirmation result, whether or not the user is an authorized user;
retrieving the document data, stored, on the basis of a result of the decision;
outputting a result of the retrieval;
issuing a new password automatically, in response to receiving from a user a request for retrieval of the document data in said receiving step, wherein the user is notified of the new password if the user is authorized; and transmitting the new password to the managing unit to register the new password as a valid password.

36. A record medium according to claim 35, wherein the reception of the password in said receiving step includes local reception for receiving a request from the user, if a local user, and remote reception for receiving a request from the user, if a remote user, through a network.

37. A record medium according to claim 36, wherein said local reception is conducted to receive a retrieval request and a password inputted through a control panel.

38. A record medium according to claim 36, wherein said computer program further comprises the step of reading an original to produce image information, with said local reception being conducted to receive a retrieval request and a password extracted from the image information.

39. A record medium according to claim 36, wherein said remote reception is conducted to receive a retrieval request and a password sent from a terminal through a network.

40. A record medium according to claim 36, wherein said remote reception is conducted to receive a retrieval request and a password extracted from image information sent from a terminal through a network.

41. A record medium according to claim 36, wherein said computer program further comprises the step of receiving a facsimile image through a facsimile receiver, with said remote reception being conducted to receive a document data retrieval request and a password extracted from an image obtained through facsimile transmission.

42. A record medium according to claim 36, wherein said retrieval result is outputted in a different manner in accordance with whether said password is received by way of said local reception or said remote reception.

43. A record medium according to claim 36, wherein said computer program further comprises the steps of conducting facsimile transmission to a predetermined address through the use of a facsimile transmitter, and, when a retrieval request is received by a facsimile reception, transmitting said retrieval result in the form of a facsimile image to a request requesting facsimile unit through the use of said facsimile transmitter.

44. A computer readable record medium storing a computer program to be run by a computer of a processing unit for retrieving document data, said computer program comprising the steps of receiving a request for a retrieval of the document data, including a password, from a user;

confirming that the user is authorized, on the basis of the received password;

retrieving the document data, stored, on the basis of a result of the confirmation;

outputting a result of the retrieval;

issuing a new password automatically in response to receiving of the retrieval request, wherein the user is notified of the new password if the user is authorized; and notifying the user of the new password in a mode corresponding to a mode taken at the reception of the retrieval request.

45. A record medium according to claim 44, wherein the reception of the retrieval request includes local reception for receiving a request from the user, if a local user, and remote reception for receiving a request from the user, if a remote user, through a network, with the notification of the new password being made by displaying the new password on a control panel when the request is made through local reception.

46. A record medium according to claim 45, wherein said local reception is conducted to receive a retrieval request and a password input through a control panel.

47. A record medium according to claim 45, wherein said computer program further comprises the step of reading an original to produce image information, with said local reception being conducted to receive a retrieval request and a password extracted from the image information.

48. A record medium according to claim 45, wherein the notification of the new password is made through a network when the request is made by said remote reception.

49. A record medium according to claim 48, wherein said remote reception is conducted to receive a retrieval request and a password sent from a terminal through a network.

50. A record medium according to claim 48, wherein said remote reception is conducted to receive a retrieval request and a password extracted from image information sent from a terminal through a network.

51. A record medium according to claim 48, wherein said computer program further comprises receiving a facsimile image, with said remote reception being conducted to receive a document data retrieval request and a password extracted from an image obtained by facsimile reception.

* * * * *

UNITED STATES PATENT AND TRADEMARK OFFICE
CERTIFICATE OF CORRECTION

PATENT NO. : 6,950,202 B1  Page 1 of 1
APPLICATION NO. : 09/473659
DATED : September 27, 2005
INVENTOR(S) : Kikugawa It is certified that error appears in the above-identified patent and that said Letters Patent is hereby corrected as shown below:

TITLE PAGE; COVER SHEET:
(56) References Cited, Insert -- 6,161,185  12/2000 Guthrie et al. ..... 713/201 --.

COLUMN 9:
Line 26, "document - (an" should read -- document (an --.

COLUMN 13:
Line 34, "password-upon" should read -- password upon --.

COLUMN 14:
Line 54, "Out" should read -- out --.

COLUMN 16:
Line 52, "817," should read -- S817, --.

COLUMN 18:
Line 47, "Still-additionally," should read -- Still additionally, --.

COLUMN 20:
Line 5, "receiver" should read -- receiver receives --;
Line 9, "da" should read -- data --;
Line 19, "receive" should read -- received --; and
Line 56, "to 11," should read -- to claim 11, --.

Signed and Sealed this

Third Day of June, 2008

JON W. DUDAS
*Director of the United States Patent and Trademark Office*